United States Patent
Child et al.

(10) Patent No.: US 10,999,561 B2
(45) Date of Patent: May 4, 2021

(54) METHODS FOR USING AN IMAGE CAPTURE DEVICE INTEGRATED AT A BUILDING ENTRY WITH AN AUTOMATION CONTROL PANEL, AND SYSTEMS AND DEVICES RELATED THERETO

(71) Applicant: Vivint, Inc., Provo, UT (US)

(72) Inventors: Michael D. Child, Lehi, UT (US); Todd Matthew Santiago, Orem, UT (US); Jeremy B. Warren, Draper, UT (US)

(73) Assignee: Vivint, Inc., Provo, UT (US)

( * ) Notice: Subject to any disclaimer, the term of this patent is extended or adjusted under 35 U.S.C. 154(b) by 261 days.

(21) Appl. No.: 14/202,687

(22) Filed: Mar. 10, 2014

(65) Prior Publication Data

US 2014/0267716 A1    Sep. 18, 2014

Related U.S. Application Data

(60) Provisional application No. 61/790,708, filed on Mar. 15, 2013.

(51) Int. Cl.
*H04N 5/76* (2006.01)
*G08B 13/196* (2006.01)
*H04N 7/18* (2006.01)

(52) U.S. Cl.
CPC .................. *H04N 7/186* (2013.01)

(58) Field of Classification Search
CPC ........ G08B 13/19684; G08B 13/19695; G08B 25/004; G08B 25/009; G08B 29/00; G08B 25/001; G08B 29/08; G08B 13/19602; G08B 13/19663; G08B 13/19669; G08B 21/18; G08B 13/19613; G08B 13/19697; G08B 13/2491; G08B 25/08;
(Continued)

(56) References Cited

U.S. PATENT DOCUMENTS 5,448,320 A    9/1995  Sakai et al.
6,429,893 B1   8/2002  Xin
(Continued)

FOREIGN PATENT DOCUMENTS

JP    06067266     3/1994
JP    2002010369   1/2002
(Continued)

OTHER PUBLICATIONS

International Search Report for PCT/US2014/023408, dated Jul. 14, 2014.
(Continued)

*Primary Examiner* — Dave Czekaj
*Assistant Examiner* — Samuel D Fereja
(74) *Attorney, Agent, or Firm* — Holland & Hart, LLP

(57) ABSTRACT

A method for a security and automation system is described. The method may include detecting that a person is present at or near the entry to the structure, capturing an image of the person in response to detecting that the person is present, comparing the image of the person to a database of images associated with the structure, identifying an identity of the person based at least in part on the comparing, and transmitting the captured image based at least in part on the identity of the person to a control panel of an automation and security system of the structure.

18 Claims, 13 Drawing Sheets

(58) Field of Classification Search
CPC ........ G08B 13/19634; G08B 13/19639; G08B 13/1966; G08B 13/2402; G08B 13/2462; G08B 29/046; G08B 25/10; G08B 13/19641; G08B 13/19682; G08B 13/22; G08B 21/0261

See application file for complete search history.

(56) References Cited

U.S. PATENT DOCUMENTS

| | | | |
|---|---|---|---|
| 6,456,322 B1 | 9/2002 | Marinacci | |
| 6,658,091 B1* | 12/2003 | Naidoo | G08B 13/19669 379/37 |
| 7,126,473 B1 | 10/2006 | Powell | |
| 8,350,697 B2 | 1/2013 | Trundle et al. | |
| 8,520,072 B1* | 8/2013 | Slavin | G08B 13/19684 348/143 |
| 8,675,071 B1* | 3/2014 | Slavin | H04M 11/04 348/143 |
| 8,768,425 B2* | 7/2014 | Kostenich | A61B 5/0084 600/310 |
| 8,786,425 B1* | 7/2014 | Hutz | H04M 11/04 340/506 |
| 9,064,394 B1* | 6/2015 | Trundle | G08B 13/19684 |
| 2002/0070858 A1* | 6/2002 | Gutta | G06K 9/00255 340/541 |
| 2002/0094111 A1* | 7/2002 | Puchek | G06K 9/00973 382/115 |
| 2003/0062997 A1* | 4/2003 | Naidoo | G08B 13/19656 340/531 |
| 2003/0164877 A1* | 9/2003 | Murai | G08B 13/19656 348/143 |
| 2005/0116480 A1* | 6/2005 | Deng | E05B 47/0676 292/289 |
| 2005/0134450 A1* | 6/2005 | Kovach | G08B 29/183 340/506 |
| 2007/0182540 A1* | 8/2007 | Marman | G06K 9/00979 340/506 |
| 2007/0262857 A1* | 11/2007 | Jackson | G08B 13/19656 340/506 |
| 2008/0129821 A1* | 6/2008 | Howarter | G08B 13/196 348/143 |
| 2008/0136908 A1* | 6/2008 | Carter | H04M 11/025 348/143 |
| 2008/0284580 A1* | 11/2008 | Babich | G08B 13/19684 340/502 |
| 2009/0181640 A1* | 7/2009 | Jones | G08B 13/196 455/404.2 |
| 2011/0102588 A1* | 5/2011 | Trundle | G08B 13/196 348/143 |
| 2012/0200711 A1* | 8/2012 | Dolin | H04N 7/181 348/159 |
| 2012/0207445 A1* | 8/2012 | Thomas | G06F 21/00 386/234 |
| 2012/0297461 A1* | 11/2012 | Pineau | H04L 63/0815 726/4 |
| 2013/0057695 A1 | 3/2013 | Huisking | |
| 2014/0210590 A1* | 7/2014 | Castro | G07C 9/00563 340/5.52 |

FOREIGN PATENT DOCUMENTS

| | | |
|---|---|---|
| KR | 1020110107521 | 10/2011 |
| WO | 2009113892 | 9/2009 |

OTHER PUBLICATIONS

English Abstract for JP2002010369. Jan. 11, 2002.
English machine translation of the specification, claims and abstract for KR1020110107521. Oct. 4, 2011.
Extended European Search Report for EP Application No. 14769701.5, dated Jun. 15, 2016 (9 pp.).
Canadian Intellectual Property Office, "Examiner's Requisition" issued in connection with Canadian Patent Application No. 2,902,332, dated Jan. 11, 2021 (5 pages).

\* cited by examiner

METHODS FOR USING AN IMAGE CAPTURE DEVICE INTEGRATED AT A BUILDING ENTRY WITH AN AUTOMATION CONTROL PANEL, AND SYSTEMS AND DEVICES RELATED THERETO

CROSS-REFERENCE TO RELATED APPLICATIONS

This application claims the benefit of the filing date of U.S. Provisional Application No. 61/790,708, filed Mar. 15, 2013, and entitled METHODS FOR USING AN IMAGE CAPTURE DEVICE INTEGRATED AT A BUILDING ENTRY WITH AN AUTOMATION CONTROL PANEL, AND SYSTEMS AND DEVICES RELATED THERETO, which is assigned to the assignee hereof.

TECHNICAL FIELD

The present disclosure relates to cameras and imaging systems. More particularly, embodiments of the present disclosure relate to the use of cameras or other image capture devices at or near an entry to a physical location. More particularly still, embodiments of the present disclosure relate to image capture systems that capture images at the entry to a location and provide the images to a remote location such as an automation system control panel and/or a mobile device of an owner, resident or employee of the home or business where the image was captured.

BACKGROUND

People are increasingly interested in providing security to a building. Security in a home setting may be particularly significant for a home owner or resident who is away from home, who has small children, or who keeps valuable items at the home. For such an owner or resident to feel secure, security and privacy may be provided through various security mechanisms. Example methods include using door and window locks, the use of video security cameras, or intrusion detection security systems.

Camera-based security systems are often complex and unreliable. For instance, security cameras are often highly visible to a sophisticated intruder, and may be taken offline so as to provide little or no benefit. In other cases, the camera footage may be viewed after an intruder enters a structure; however, by that time valuable may be stolen or other damage may be done, or the intruder may hide his or her face from the visible cameras. Moreover, the security system may be specialized, and be difficult and expensive to integrate into a home environment. As an example, some security systems may require extensive wiring between system components.

Even when security systems are used, they may require the user to be in a particular location and/or sort through multiple hours of data in order to find relevant information. All video footage may be viewable at a single console configured to display information. Moreover, because the video footage is continuous, many hours of footage may be present despite only a few seconds or minutes of data that provide a view of an intruder or other person of interest. Thus, large quantities of data may be required to store security data. Consequently, few home owners may justify the cost and expense of a home security system that captures and stores all video footage.

SUMMARY

Methods and systems are described for controlling access to a home based on user occupancy. According to at least one embodiment, a computer-implemented method for monitoring an entry to a structure includes detecting that a person is present at or near an entry to a structure, capturing an image of the person in response to detecting that the person is present, and transmitting the captured image to a control panel of an automation and security system of the structure for delivery of the captured image to a remote computing device.

In one example, detecting that the person is present may include at least one of sensing motion at or near the entry to the structure, sensing a pressure on a handle of an access element at or near the entry, sensing vibration at or near the entry, sensing sound at or near the entry, and sensing activation of a doorbell at or near the entry. The access element may be a door or window. The method may include turning on a camera in response to detecting that a person is present at or near the entry, the camera being operable to capture the image. The access element may include at least one of a handle, a lock, a light fixture, a doorbell, a peephole, and a window. Capturing the image may include operating a camera, the camera being integrated into an access element component at the entry. The camera may be arranged to be inconspicuous. Capturing the image may include operating a camera, the camera being part of an image capture system extending through a door at the entry. The image capture system may include a camera, a power supply, and a transmitter. The camera may include a lens exterior to the door, and the power supply and transmitter may be interior to the door. The method may include processing the captured image to at least one of detect an identity of the person, detect a category of the person, or timestamp the image.

According to another embodiment, a computer-implemented method for monitoring an entry to a structure using a control panel of an automation system may include receiving image data at a control panel of the automation system, the image data corresponding to a person at an entry to a physical structure, sending the image data from the control panel to a remote computing device, receiving an instruction from the remote computing device to perform an event using the automation system, and triggering the event.

In one example, triggering the event may include at least one of establishing a communication session between a mobile wireless device and a communication system at the entry, turning a light on or off at the physical structure, locking or unlocking a door of the physical structure, turning an alarm on or off at the physical structure, and arming or disarming a security system at the physical structure. Receiving an instruction from the remote computing device to perform an event using the automation system may include receiving audio or video data from a mobile wireless device, and triggering the event may include sending the audio or video data to a communication system at the entry of the physical structure. The method may include automatically determining a content of the image data. Automatically determining the content may include performing facial recognition. The method may include sending the image data to the remote computing device only when the content satisfies predetermined criteria.

Another embodiment relates to an automation system for a physical structure. The system includes a control panel configured to communicate with at least one mobile wireless device, including sending image data to the at least one mobile wireless device using electronic messaging protocols. The system also includes at least one automation component wirelessly connected to the control panel through short range wireless communication protocols. The at least one automation component includes at least one sensor configured to detect a presence of a person at an entry to the physical structure, at least one camera inconspicuously integrated within an entry component at the entry, and at least one short range wireless transceiver coupled to the at least one sensor and the at least one camera and configured to communicate image and sensor data to the control panel and to receive control information from the control panel.

The at least one sensor and the at least one camera may be part of an imaging capture system. The control panel may include an image capture module operable to determine when the sensor indicates the presence of the person at the entry, selectively capture at least one image at the entry when the person is present, and selectively send the at least one image to the at least one mobile wireless device.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the spirit and scope of the appended claims. Features which are believed to be characteristic of the concepts disclosed herein, both as to their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

In order to describe the manner in which features and other aspects of the present disclosure can be obtained, a more particular description of certain subject matter will be rendered by reference to specific embodiments which are illustrated in the appended drawings. Understanding that these drawings depict only typical embodiments and are not therefore to be considered to be limiting in scope, nor drawn to scale for all embodiments, various embodiments will be described and explained with additional specificity and detail through the use of the accompanying drawings in which.

Figure 1:
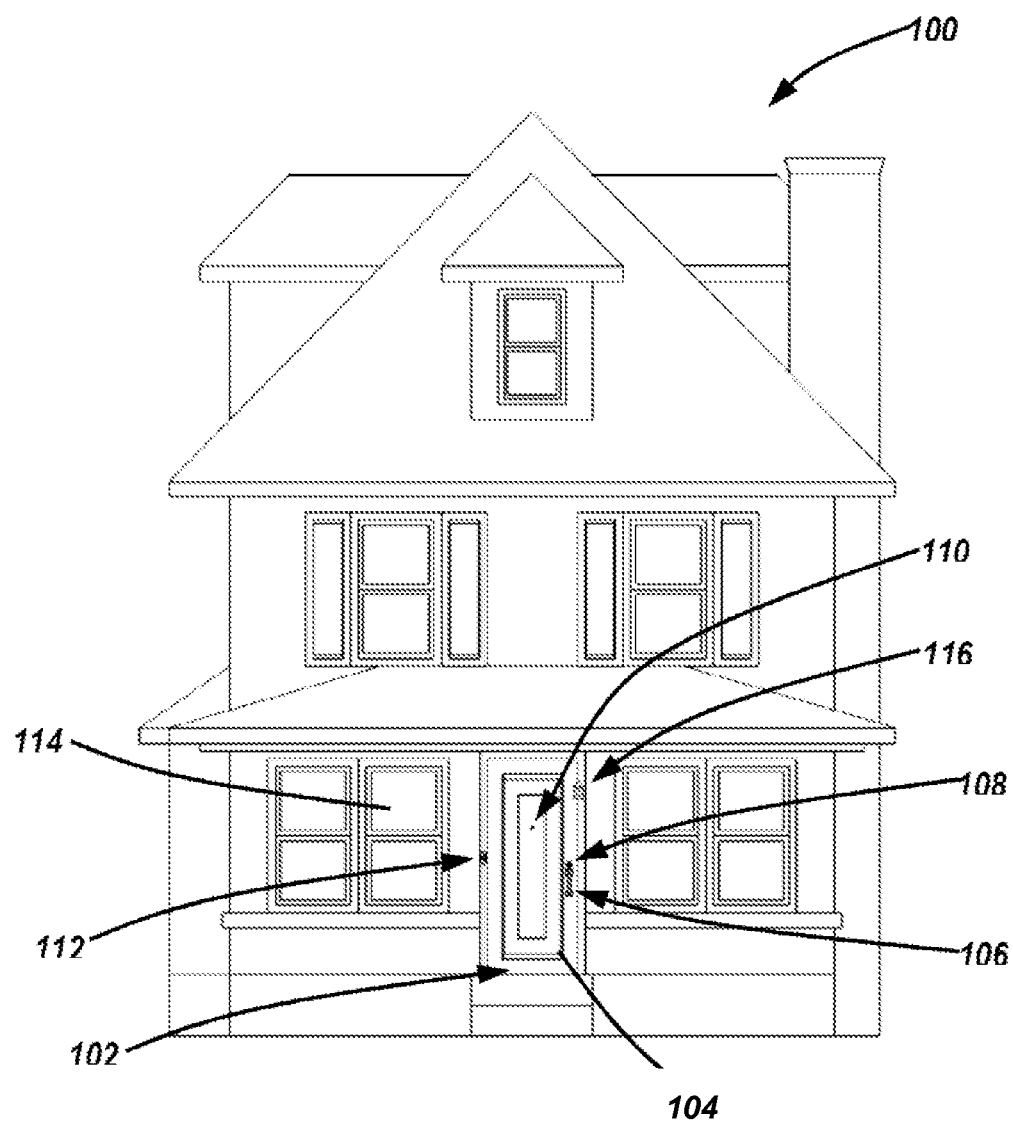
FIG. 1 illustrates a structure having an entry with a door thereto, and which may be used with image capture systems of the present disclosure.

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION

Systems, devices and methods according to the present disclosure are configured for use in connection with residential and/or commercial buildings, or with other locations having an entry or access point where people, animals or the like may be monitored. Without limiting the scope of the present disclosure, a home or business may have a door, window or other access point or entry component that a person could potentially use to enter the structure. When the person approaches the access point, an imaging system may capture an image of the person. An imaging system may include a camera or other device suitable for capturing a still, video or other image of the person. That image may then be transferred to a remote location where another person can view the image. By way of example, the imaging system may send the image to an owner or resident of the building, or security for the building. The image may be sent to a mobile device such as a mobile phone, personal media player, or the like. Additionally, or alternatively, the image may be sent to a control panel for an automation system for the building. In such an embodiment, the imaging system may be a component of the automation system.

Turning now to FIG. 1, an example structure 100 is shown. The structure 100 may include a home, office, apartment, or other structure, or some combination thereof. In general, however, the structure 100 may include one or more access points. The illustrated embodiment, for instance, includes an entry 102 which may be used to access the structure 100. The entry 102 is shown as including a door 104 through which a person may enter the structure 100, and may be a porch or other type of entry. Additionally, some embodiments of a structure 100 may include a window 114. The window 114 may represent another access point through which a person may enter the structure 100, whether or not the window 114 is intended for such a purpose.

In accordance with various aspects of the present disclosure, an access point, such as the entry 102, may include various components providing for the safety of the resident or user of the structure 100 and/or for the benefit of a person trying to enter the structure 100. FIG. 1, for instance, illustrates one or more security components provided for use with the door 104. One or more locks may, for instance, be provided on the door 104. In this particular example, the door 104 includes a handle 106 which may be used to open a door and which optionally includes a lock integrated therewith. Additionally, or alternatively, an additional lock 108 may be provided. The lock 108 may include a deadbolt lock or some other style of lock as known in the art. While only two handle 106 and lock 108 components are illustrated, other users may use fewer or more locks, and locks may have any of a number of different styles. Indeed, to further secure the structure 100, three or more locks may be provided, including additional locks at the door 104 and/or on the window 114.

Another security element illustrated in FIG. 1 is a peephole 110 included on the door 104. A peephole 110 may generally include an opening in the door through. When a person on the interior of the structure 100 looks through the peephole 110, the person may be able to view the exterior of the structure 100. A person or object exterior to the structure and within the field of view of the peephole 110 may be visible. Optionally, the peephole 110 may be configured such that a person exterior to the door 104 is unaware when someone interior to the structure 100 someone is using the peephole 110.

Additional or other components may also be provided at the entry 102 or near the window 114. In the illustrated embodiment, for instance, a doorbell 112 is provided. The doorbell 112 may be used in a manner known by those skilled in the art. In particular, a person may press the doorbell 112. In response, a chime or other sound may sound within the structure 100 to alert a person that some is present at the door 104. Of course, the doorbell 112 may be replaced or supplemented by other components, such as a door-knocker. Accordingly, it should be appreciated in view of the disclosure herein that all of the security, entry or other components shown in FIG. 1 are merely optional, and that other or additional components may be used. By way of example, additional components that could be present at the entry 102 and/or the window 114 may include lighting (e.g., light 116), motion control sensors (e.g., to selectively turn on or off light 116), alarm sensors, proximity sensors, intercom systems, or other components, or some combination thereof.

Figure 2:
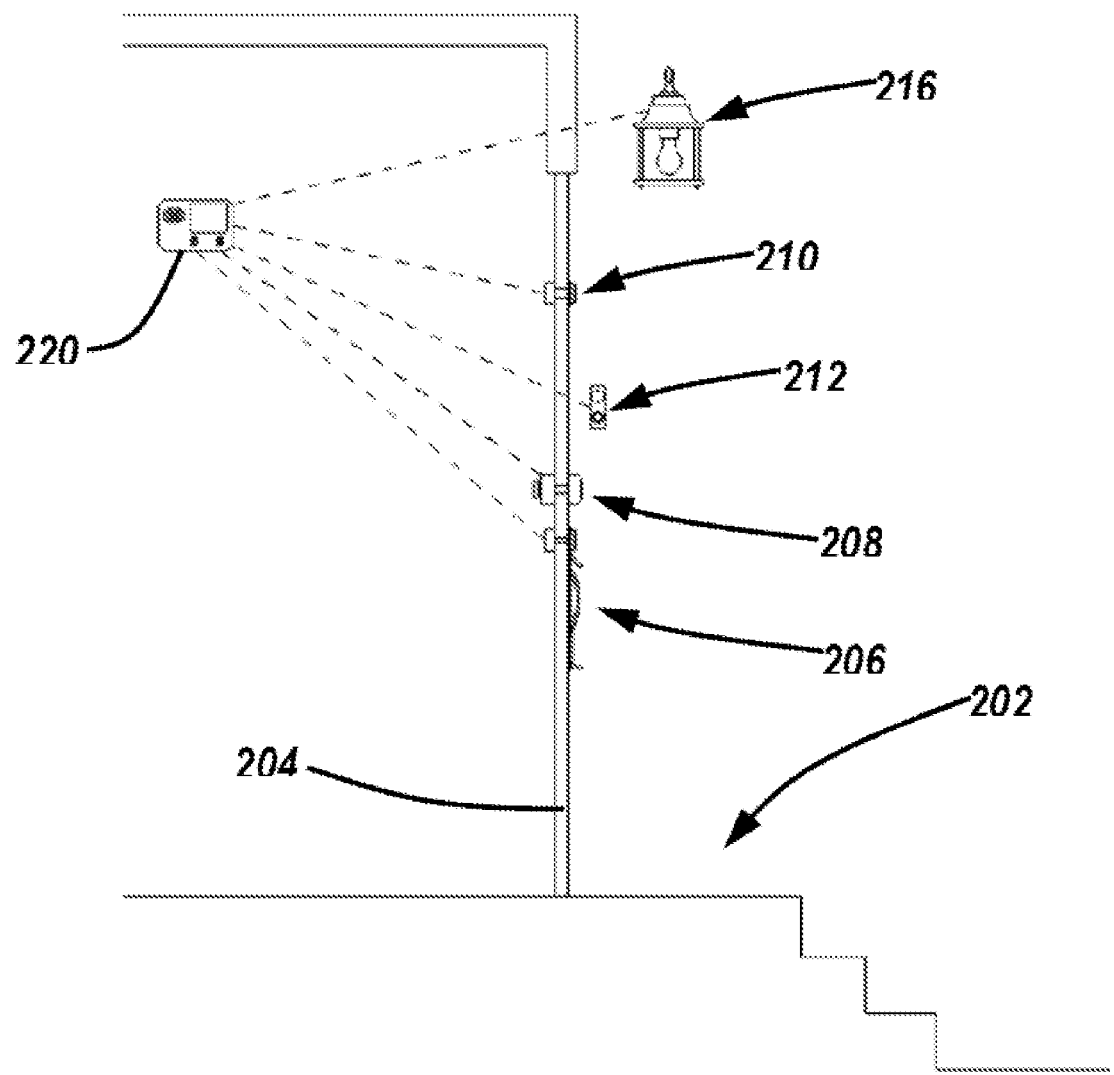
FIG. 2 is a schematic illustration of an entry to a building or other structure, the entry including an access point along with one or more cameras.

Turning now to FIG. 2, another embodiment of an example structure 200 is shown in additional detail. In this particular embodiment, the structure 200 is shown as including an entry 202, with a door 204 through which a person may enter or exit the structure 200. While a door 204 is shown, it should be appreciated that any other access point may be substituted, including a window or the like.

The structure 200 may include one or more elements for securing the structure 100, notifying an occupant of the structure 200 when someone is at the entry 202, or otherwise enhancing the ability of a person within the structure 100, or who owns, occupies or is otherwise associated with the structure 100, to interact with people who are at the entry 102. Some examples of such elements are shown in FIG. 2 and discussed in greater detail below, although such components are not intended to be exclusive.

As shown in FIG. 2, the door 204 may include a handle 206 and/or deadbolt lock 208. The handle 206 may include a knob or other grip which may be used by a user inside or outside of the structure 200 to easily open or close the door 204. Optionally, the handle 206 may also including a locking component. An example locking component may include a physical component that may be turned or depressed from inside the structure 200 to engage the locking element and lock the door 204. Optionally, a physical key or electronic keypad may be used from outside the structure 200 to disengage the lock. When locked, the door 204 may resist being opened. The deadbolt lock 208 may operate in a similar manner. In particular, a physical element may be turned, depressed, or otherwise engaged from the inside of the structure 200 to lock the door 204, while a key, electronic code, or the like may be used from the exterior of the structure 200 to disengage the deadbolt lock 208.

An additional security element of the structure 200 of FIG. 2 includes a peephole 210. As discussed above relative to FIG. 1, a peephole (e.g., peephole 210) may extend through the door 204 and include an opening therein. A person on the interior side of the door 204 may therefore look through the interior opening of the peephole 210 to view someone within the visible area provided by an exterior opening of the peephole 210. A doorbell 212 and light 216 may also be positioned at or near the entry 202 and may be used as described above with respect to the doorbell 112 and light 116 of FIG. 1.

According to some or all embodiments, the structure 200 may include components in addition to, or instead of, those elements previously described with respect to the embodiment of FIG. 2. As an example, FIG. 2 illustrates one example embodiment in which a control panel 220 for a security or automation system may be used within the structure 200. A security system may, for instance, include one or more sensors or other components that detect an intruder in the structure 200, fire, smoke, carbon monoxide, or other safety-related events. An automation system may include security elements and/or other elements associated with the structure 200. Example automation systems may, for instance, be used to manually or automatically control sprinkler systems, entertainment systems, audio systems, heating and air conditioning (HVAC) systems, lighting systems, telephone systems, Internet or network communication systems, or other systems, or some combination thereof, for the structure 200.

As shown in FIG. 2, the control panel 220 optionally communicates with one or more of the components at the entry 202. Such communication may be for any number of different purposes, including to receive input from such components, or to provide control instructions to, such components. As an example, the control panel 220 may communicate with the handle 206 and/or lock 208 to remotely lock the door 204. The control panel 220 may detect when the doorbell 212 is depressed. In response, the control panel 220 may play a chime or other sound, turn on a light (e.g., light 216), or otherwise provide an alert intended to notify someone of the presence of a person at the entry 202. Optionally, the control panel 220 may communicate with the light 216 to detect or change the on/off status of the light 216.

In accordance with some embodiments, and as discussed in greater detail herein, the control panel 220 optionally communicates with the security or other elements at the entry 202 in order to obtain information about a person at the entry. Such a person may or may not be requesting or attempting to enter the structure 200. One manner in which information may be obtained may be with the use of imaging systems. An imaging system may include a camera or other component to capture still, video, thermal or other images of a person outside of the structure 200 and near the entry 202. The captured images may then be provided to the control panel 220 for view by an occupant or other person associated with the structure 200, even without the person having to be near the door 204 or use the peephole 210. Optionally, however, the imaging systems may operate without the control panel 220. Example imaging systems may operate with or without the knowledge of the person outside of the structure 200, and are described in greater detail herein.

Figure 3:
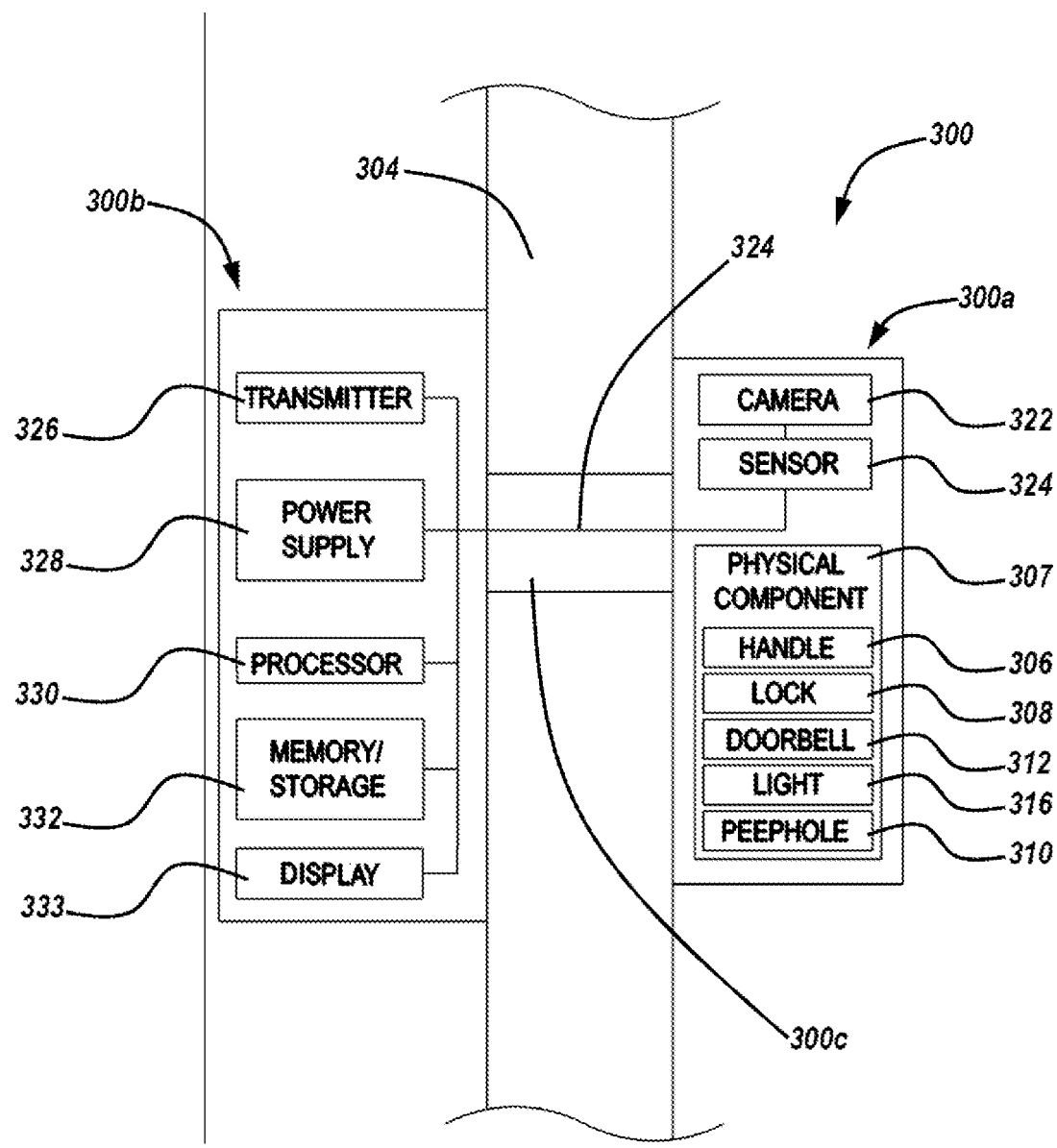
FIG. 3 is a schematic illustration of an image capture system that includes a camera for obtaining an image at an access point to a building.

FIG. 3, for instance, schematically illustrates an example imaging system 300 that is used in connection with a door 304, window, or other element that may be used to gain access to a structure. The imaging system 300 may be specifically used to obtain an image of a person, object, scene, or circumstance at the exterior of a potential access point to the structure, and convey the image data to a remote device. At the remote device, an owner, an occupant, an employee, security personnel, or some other person, or even electronic components, may review the received image.

In this particular embodiment, the imaging system 300 includes both interior and exterior components. An exterior component 300a may, for instance, include elements that are wholly or partially exterior to the door 304. As an example, the exterior component 300a may include a camera 322 that is at least partially exterior to the door 304, or which can take images of a scene outside of the door 304. The camera 322 may communicate with an interior component 300b. The interior component 300b may in turn display the images or may otherwise process and/or transmit the images. In some embodiments, the exterior component 300a may be wholly exterior to the door 304. In such an embodiment, an intermediate connector 300c may pass through or around the door 304 to connect the exterior component 300a and interior component 300b of the imaging system 300. In other embodiments, however, at least some of the exterior component 300a may be within the door 304, and could even extend fully through the door 304 to the interior of a corresponding structure. In such an embodiment, the intermediate connector 300c may be a part of the exterior component 300a.

It is contemplated in accordance with some embodiments of the present disclosure that the camera 322 or other similar components of the imaging system 300 be used to capture images that may be stored or used in real-time so as to provide information about conditions outside of the structure for which the door 304 is used. Some aspects of an example system are described in connection with this FIG. 3; however, other aspects should be appreciated by a person of ordinary skill in the art in view of the disclosure herein.

The example embodiment of FIG. 3 illustrates an example in which an imaging system 300 is integrated with one or more physical components 307 existing exterior to the door 304. In this particular embodiment, for instance, the door 304 may have an exterior handle 306, lock 308, peephole 310, doorbell 312, light 316, or the like. The imaging system 300 may be integrated with such physical components in some embodiments. By way of illustration, the door 304 may be configured to have a deadbolt lock (e.g., lock 308) connected thereto. A standard deadbolt lock may include a bolt, latch, housing, shield, strike plate, and the like. A deadbolt lock of the present disclosure could include similar or the same components, and also include the camera 322. Optionally, the camera 322 may be provided in a manner that is inconspicuous to the casual observer. For instance, the camera may be largely hidden in the housing with a pinhole lens allowing for exterior access to capture images. Similarly, a camera may be provided in a conspicuous or inconspicuous manner and integrated with a handle/lock, doorbell, door knocker, light, peephole or the like (see, e.g., FIGS. 4A-4C).

Regardless of the precise location and structure of the camera 322, and whether or not it is integrated with another physical component (e.g., handle 306, lock 308, peephole 310, doorbell 312, light 316, etc.), the camera may be coupled to one or more components that allow the images to be displayed in real-time and/or stored for subsequent access. FIG. 3 illustrates an example embodiment in which captured images may be used in either real-time or delayed manners.

More particularly, an interior component 300b of the imaging system 300 may optionally include a display 333. The display 333 may include a screen that may show, in real-time, images captured by the exterior component 300a. The display 333 may therefore be able to provide peephole-like abilities and views, without a user needing to bend down, squint, or otherwise take physical actions typically associated with looking through a peephole. Of course, the display 333 could also be on a wall, control panel, other door, or other location rather than directly on the interior side of a doorway where a camera is located.

A communicative connection 334 may further connect the illustrated camera 322 to a transmitter 326. When a photograph, video, or other image is obtained by the camera 322, the image data may be sent over the communicative connection 334 to the transmitter 326. The transmitter 326 may, in turn, be linked to one or more other components and capable of transmitting the image data thereto. For instance, as discussed in connection with FIG. 2, an automation system may be used in connection with the imaging system 300. In such an embodiment, the transmitter 326 may transmit the image data to a control panel for the automation system. The control panel may then display the image data and/or further process the data. In one embodiment, the control panel may send the image data to a remote source (e.g., a mobile device) as discussed in greater detail herein. Whether image data is sent to a control panel, mobile device, or other device, some embodiments contemplate that the image data may include audio data in addition to, or instead of, video or still image data. If the camera 322 is not equipped with night-vision, for instance, audio data may provide some information that may be missed without sufficient light to capture still or video images.

In other embodiments, however, the image data may be sent to other locations. As an example, the transmitter 326 may be configured to connect to a communication network in any of a number of different manners (e.g., WiFi, Bluetooth, NFC, Zigbee, S-Wave, GSM, LTE, HSPA+, CDMA, etc.). When the image data is received, the transmitter 326 may send the data to the communication system for transmission to a remote source in an email, text message, MMS, or other type of standard or proprietary message. For instance, the transmitter 326 may be configured to transmit image data to a specific telephone number or email address. As a result, when the camera 322 obtains an image, the image data may be attached to a text message or email and sent by the transmitter 326 via a communication network. Consequently, one or more people who are to receive the images may receive messages that include the image data, regardless of whether or not they are located near the structure to which the door 304 provides access. A user may therefore be able to receiver image data for a particular location, with the image data either being passed through a control panel of an automation system, or which bypasses such a control panel.

Other components may also be provided for use by an example imaging system 300. FIG. 3, for instance, illustrates an example embodiment in which the interior component 300b of the imaging system 300 includes memory or another storage element 332. The memory/storage element 332 may be used to store image data captured by the camera 322. For instance, all images captured over a specific period of time (e.g., one day, one week, one month, one year, etc.) may be stored in the memory/storage 332 and then accessed as needed. In one embodiment, the memory/storage 332 may be removable and/or expandable. Thus, if a user needs to access the images, the user may remove the memory/storage 332 and replace it, although in other embodiments a physical or wireless data connection may be used to access stored images.

Other components used by the imaging system 300 may include a power supply 328, processor 330, sensor 324, or other components, or some combination thereof. For instance, the camera 322 may operate in a continuous mode or intermittently. When operating continuously, the camera 322 may use more power and/or storage space than when operating intermittently. Accordingly, one embodiment contemplates use of the sensor 324 to determine when to turn on the camera 322 and/or capture image data.

An example sensor 324 may be used to detect the presence of a person or object within the range of the camera 322 or within a more limited area (e.g., an entry to a structure). An example sensor 324 may include a motion sensor which detects motion within a particular area. If there is any motion, or sufficient motion for a sustained period of time, the sensor 324 may activate the camera 322 and cause one or more images to be captured. In a similar manner, the sensor 324 may be a proximity sensor. If an object is determined to be near a particular location using the proximity sensor, the camera 322 may be similarly activated.

Other types of sensors may also be used. For instance, the sensor 324 could be integrated with the doorbell 312. If the doorbell 312 is rung, the sensor 324 may activate trigger image capture by the camera 322. Another example of a sensor 324 may include a pressure sensor. The pressure sensor could be located at the entry and determine when a person steps on a doorway, for example. Alternatively, a pressure sensor could be integrated into a door, door handle or the like. When a person steps on the doorway, or when the user knocks on the door or grasps the door handle, the pressure sensor may activate the camera 322 to trigger the capture of one or more images. The sensor 324 could also be a vibrational or sound sensor. As an example, if a user knocks on the door 304, generated sound or vibrations may trigger the camera 322. A person speaking, shoes scuffling, or other sounds in sufficient proximity to the sensor 324 could also be detected and used to initiate the camera 322.

The sensor 324 may be connected to the camera 322 in a manner that automatically triggers the camera 322 when appropriate situation occurs. In other embodiments, however, data from the sensor 324 may be processed to determine whether or not to trigger the camera 322. As an example, the imaging system 300 may include a processor 330 connected to the sensor 324. When an event is sensed using the sensor 324, the processor 330 may receive data. If the processor then determines the camera 322 should capture data associated with the event, the processor 330 may cause the camera 322 to begin capturing data.

The processor 330 may be used for additional or other uses. As an example, when an image is captured, the date/time associated with the image may be determined and attached to the image before the image is stored or transmitted. In another example embodiment, logic rules may be established to determine when to store or send an image. If, for instance, a user only wants images transmitted when they include a particular person or object, the processor 330 may be used to evaluate and compare the captured images (e.g., using facial recognition). Similarly, different sensors may be used. The processor 330 could be used to store or save images only when, for instance, two or more sensors are activated. Of course, any or all actions performed by the processor 330 could also potentially be performed by a control panel of an automation system in embodiments in which the transmitter 326 or another component is used to provide image data, sensed data, or any other data to the control panel.

The camera 322, sensor 324, transmitter 326, processor 330, memory/storage 332, or other components may be electrical components that use power to operate. In accordance with some embodiments, a power supply 328 may be integrated within the imaging system 300 in order to power some or all of such components. The power supply 328 may be wholly internal to the imaging system 300, or may be fully or partially external. For instance, a power supply may include batteries to operate the camera 322, transmitter 326, etc. Such batteries may be replaced as needed to ensure proper functioning of the system 300. In another embodiment, power may come from another source (e.g., a hardwired power line, a wall outlet, etc.). In some embodiments, the power supply 328 may be omitted as a separate element and the imaging system 300 may instead leveraged or supplemented from other components. As an example, a doorbell 312 or light 316 may have a separate power supply. The imaging system 300 could potentially tap into the power supplies of such systems to have sufficient power to run the camera 322, sensor 324, transmitter 326, processor 330, and the like.

As will be appreciated in view of the disclosure herein, the imaging system 300 should not be limited to any particular construction or configuration. Accordingly, while FIG. 3 illustrates an interior component 300*b* and an exterior component 300*a* of the imaging system 300, such embodiments are merely illustrative, as are the locations of certain components of the imaging system 300. For instance, rather than locating the sensor 324 in the exterior component 300*a*, a sensor could be located in the interior component 300*b* or in the intermediate connector 300*c* that attaches the interior and exterior components of the imaging system 300. In a similar manner, any or each of the transmitter 326, power supply 328, processor 330 or memory/storage 332 may be moved from the interior component 300*b* to another location (e.g., the exterior component 300*a*, an automation system control panel, etc.). Moreover, the imaging system 300 may not even include a component accessible directly from the interior of the structure in some embodiments. Indeed, the imaging system 300 may be less obtrusive when composed of components that are wholly exterior, or inside the door 304 (or a window), or which otherwise limit their extension to the interior of the building or other structure.

In accordance with one aspect of the imaging system 300 of FIG. 3, which does include an interior component 300*b*, a more intrusive imaging system 300 may provide other features. For instance, when the transmitter 326 is to send image data, sensor-related data, or other data to an automation system control panel, an interior location may facilitate communication or reduce power requirements. For instance, a wireless transmitter 326 may more easily communicate with a control panel or other communication network component so that a wireless connection is more consistent and/or the power requirements for sending a signal are reduced. Of course, the same features may be provided when the wireless transmitter 326 is a transceiver that may also receive signals from the control panel or another communication network component. Further, by positioning some components on the inside of the structure (or at least at a location difficult to access from the exterior), tampering with the components may be reduced. As an example, a person attempting to access a building with an exterior camera, could disable or remove the camera, memory/storage, transmitter, power supply, etc. in an attempt to circumvent the imaging system 300.

In accordance with some embodiments, tampering with the imaging system 300 may be reduced by extending the imaging system 300 through a door, window or the like so that some components are inside. In the same or other embodiments, tampering with the imaging system 300 may be reduced by making the camera 322 inconspicuous so that the person outside the building or other structure is less likely to easily recognize the camera 322 as a camera.

Figure 4A:
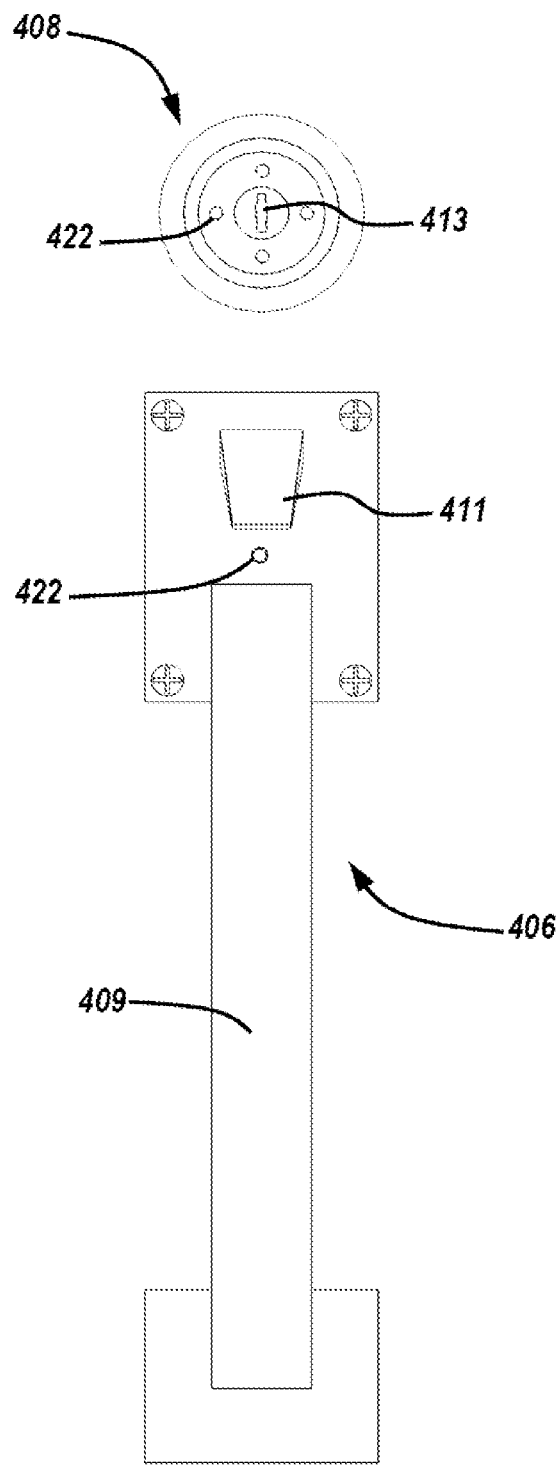
FIGS. 4A-4C illustrate example embodiments of components of a physical structure which may include a camera integrated therewith.
Figure 4B:
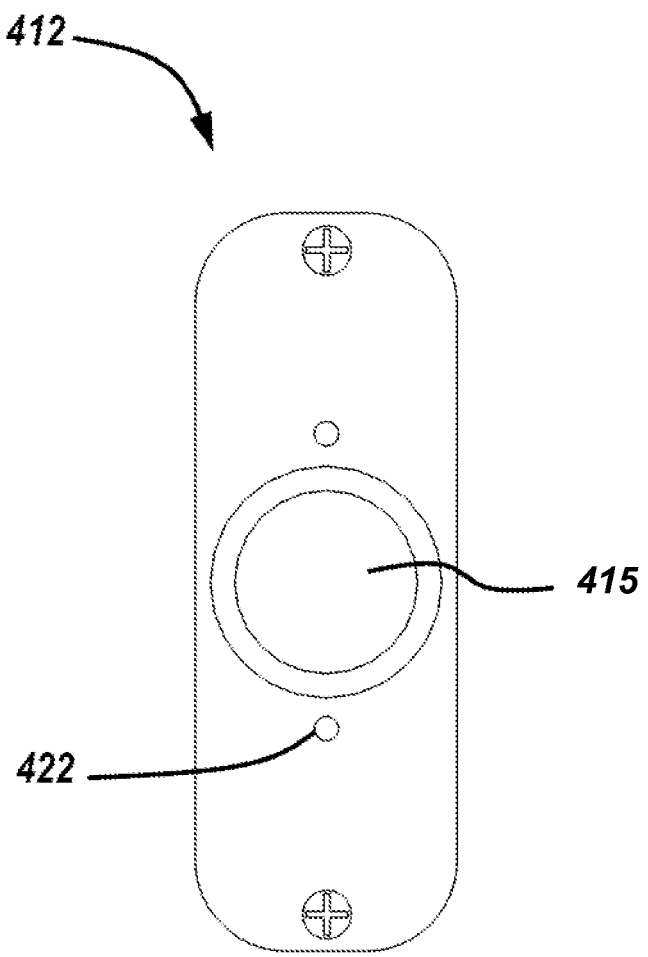
Figure 4C:
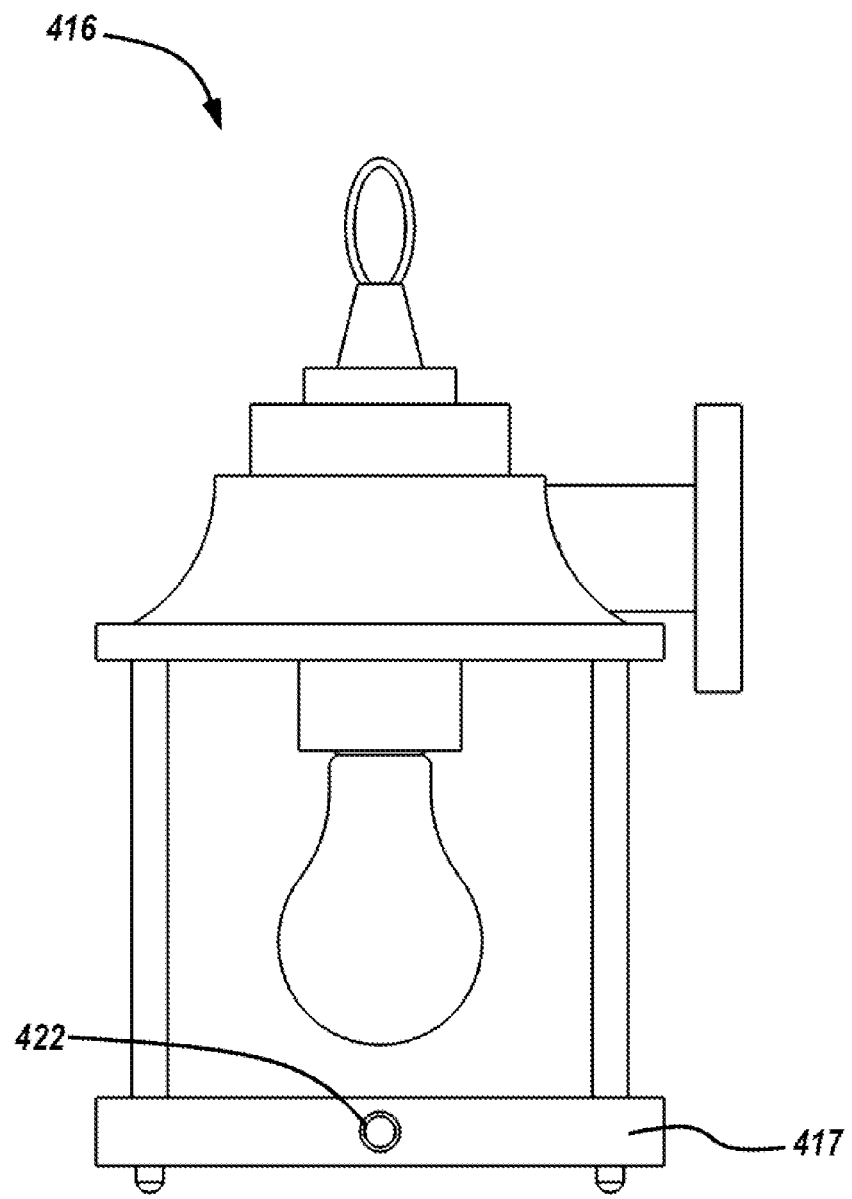

FIGS. 4A-4C illustrate some examples of physical components that may be used in an entry of a building, and which may integrate a camera or other imaging device for capturing images as disclosed herein. Each of the particular components illustrated in FIGS. 4A-4C may include some or all of the components illustrated in FIG. 3, and may include an arrangement of components that extends through a door, window, wall or other structure, or which is an exterior assembly.

FIG. 4A illustrates an exterior view of an example door handle 406 used in connection with a deadbolt lock 408. For its general operation, a user may use the handle 406 and deadbolt lock 408 combination to open a door. For instance, if the deadbolt lock 408 is in an unlocked position, the user may grasp a grip 409 of the handle 406. By pulling or pushing on the grip 409, the door may be opened. The deadbolt lock 408 may be unlocked from an interior, or from the exterior. In FIG. 4A, for instance, a keyhole 413 is provided for use with a physical key that may be used to unlock the deadbolt lock 308.

In some embodiments, the handle 406 may also include a lock element. Such a lock element may have a number of different types. The lock element of the handle 406 may be similar to that of the deadbolt lock 408 and may use a physical key, electronic keypad, or some other element to allow the door to be unlocked and/or locked from the exterior. In this particular embodiment, a release button 411 is included. The user may be required to depress the release button 411 to release a secondary lock in order to free the door from an adjacent door jamb or wall in order to open the door.

As also shown in FIG. 4A, the door handle 406 and/or deadbolt lock 408 may include a camera 422 that allows images to be taken of the environment, people, scenes, conditions, or the like that exist on the exterior of the door. In this particular embodiment, the camera 422 may be aligned with an opening on the handle 406, which opening allows the camera to view the exterior of a door. The size, position, shape, arrangement, and the like of the opening may be such that the camera 422 is fairly inconspicuous. For instance, in one embodiment, the size of the opening may be between about 0.1 inch and 1 inch in diameter. In another embodiment, the opening may be between about 0.05 inch and about 0.5 inch in diameter. Of course, the opening may be larger than 1 inch or smaller than 0.05 inch in other embodiments.

A similar camera 422 is shown as being optionally incorporated into the deadbolt lock 408 of FIG. 4A. In particular, a series of four circles surround the keyhole 413. One or more of the circles spaced apart around keyhole 413 as shown in FIG. 4A may include the camera 422. Optionally, only one of the circles includes the camera 422 such that the circles appear to be decorative. The camera 422 may therefore be inconspicuously located in the deadbolt lock 408. Similar decorative or other effects may be provided in the handle 406. Additionally, surface treatments, buttons, contours, and the like may be provided to reduce the likelihood that a person will see the camera 422 and identify it as a camera. In other embodiments, however, the cameras 422 may be in plain sight and readily identifiable as a camera.

A similar camera 422 may optionally be integrated into other components, including a doorbell 412 as shown in FIG. 4B. In this particular embodiment, the doorbell 412 includes a depressible button 415 that, when depressed, causes a chime, bell or other sound to indicate the presence of someone at the door. As further shown herein, a housing or plate to which the button 415 is attached may also house all or a portion of the camera 422. In particular, the camera 422 may be positioned, sized, or otherwise arranged in a manner that is highly visible. Alternatively, as shown in FIG. 4B, the camera 422 may be arranged, sized, or positioned in a manner that disguises the camera 422, or otherwise makes the camera 422 fairly inconspicuous so that the real nature of the camera 422 is not readily apparent.

FIG. 4C illustrates still another element that may be positioned near an access point to a building, and which may be integrated with a camera. More particularly, FIG. 4C illustrates a light 416. The light 416 may be positioned near an entry door, garage door, window, or the like. The construction of the light 416 may vary, but may include a housing 417 of some sort. The camera 422 may be integrated within the housing 417 and oriented to obtain an image from a desired location (e.g., in front of the door). As with other cameras discussed herein, the camera 422 may be highly visible, disguised, or inconspicuous. In one embodiment, the position of the light may make the camera fairly inconspicuous, although in other embodiments, the construction, size, orientation, or other configuration of the camera may define whether it is easy to recognize as a camera.

It should be appreciated that other embodiments of the present disclosure may incorporate a camera into other security or other elements at an access point of a building or other structure. For instance, a window, window lock, peephole or other element may include a camera. With respect to a peephole, for instance, the peephole may be replaced by a camera. Consequently, the nature of the camera may be disguised although the actual camera is visible. In another embodiment, a lens of a peephole may allow both a peephole and camera function to be performed.

As discussed herein, some aspects of the present disclosure contemplate the use of a camera or other image capture device in connection with an automation system for a home, office, or other structure. Integration of the image capture device in such a system is merely illustrative; however, FIGS. 4 and 5 are provided to illustrate some manners in which control panels and image capture systems may be used in tandem.

Figure 5:
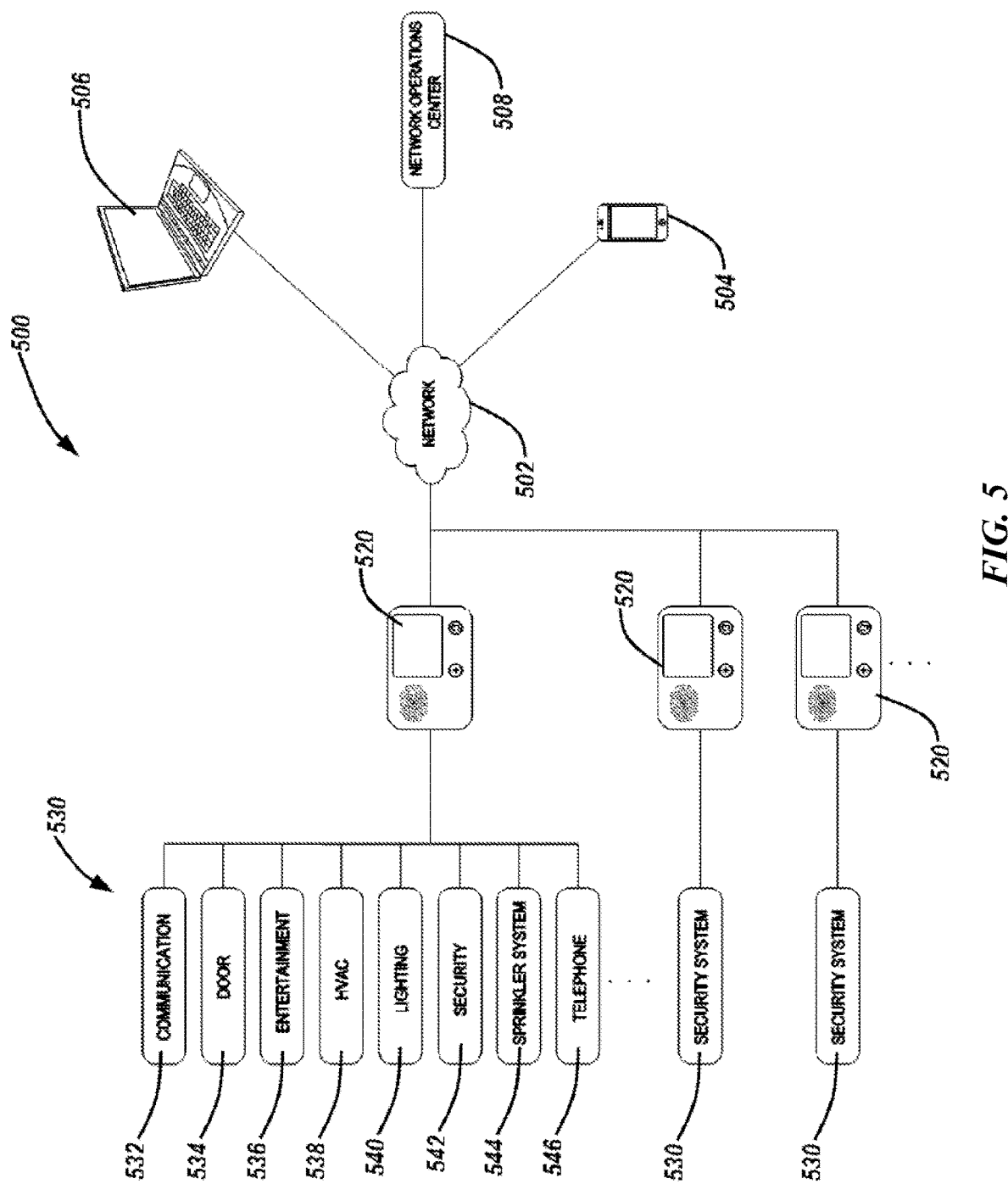
FIG. 5 is a schematic illustration of an example automation system that includes one or more control panels for communicating with imaging systems obtaining still or video images at an access point.

More particularly, FIG. 5 illustrates a distributed system 500 for allowing control or monitoring of certain aspects of a physical location (e.g., a home, office, etc.). In the illustrated system 500, the operation of the system may include a control panel 520 which communicates with a security system 530. The term "security system" may generally refer to, and include, an automation system, and need not be limited to only security-related features. Accordingly, the security system 530 may include a variety of automation components (ACs) for performing any of one or more functions. As also shown in FIG. 5, the control panel 520 optionally facilitates communication with a network operations center (NOC) using a communication network 502. A security or automation system may operate in connection with a building such as a home or other residence, an office, or the like, and may also be used in connection with any other space that may be secured by, or otherwise include ACs of, an automation system.

Each of the ACs may be used to monitor or control some aspect related to the physical location associated with a control panel 520. For instance, a set of one or more ACs may be integrated as part of a security system 542 associated with the location. In some embodiments, the ACs of the security system 542 may include sensors that detect intruders (e.g., unauthorized opening of a door or window, motion sensors, etc.), sensors that detect smoke or fire, or some other security-related component or a combination thereof. In some embodiments, the security system 542 may include ACs such as cameras which obtain still or video images of a location, including a location at or near an entry to a building or other structure. In other embodiments, a separate system (e.g., door system 534) may include cameras for monitoring access points to a structure.

ACs of the security system 542, door system 534, or any other system may also be used for more than just security, and may automate or improve efficiency of other aspects of a residence or commercial location. For instance, the ACs monitored by the control panel 520 may include one or more actuators or timers for selectively turning on or off lights as part of lighting system 540, HVAC components as part of HVAC system 538, sprinklers as part of sprinkler system 544, or other elements. Others of the ACs may be used for still other purposes, including to monitor or control entertainment components (e.g., to turn on a TV or radio, to change the volume or channel of a TV or radio, etc. as part of entertainment system 536), to control or monitor communication systems (e.g., telephone, intercom, Internet connections, etc. as part of communication system 532 or telephone system 546), or to interact with a variety of other devices or components within a residential or commercial location.

When a given condition occurs at a monitored AC, the control panel 520 may be used to cause other ACs to respond. Additionally, or alternatively, the control panel 520 may communicate with components, including those remote from the automated physical location. For instance, the control panel 520 may be capable of using the network 502, which may carry electronic communications. The Internet, local area networks, wide area networks, virtual private networks (VPN), other communication networks or channels, or any combination of the forgoing may be represented by the network 502. Thus, it should be understood that the network 502 may operate in any number of different manners, and may include different components, and may be distributed so as to include different components at different locations. For instance, the network 502 may include a wireless communication system such as that provided by a mobile phone provider. As an example, the control panel 520 may include a radio component to communicate with or using the network through GSM, CDMA, LTE, HSPA+ or other similar technologies used by mobile phone systems. In other embodiments, other wireless systems or even wired communication may be used. Any combination of the foregoing may also be used. Thus, while a single network 502 is illustrated, such a component may be illustrative of multiple devices or components. For instance, the network 502 may include multiple networks interconnected to facilitate communication.

The NOC 508 may optionally be used to monitor the some or all aspects of the operation of the control panel 520 and the automation system in which it is used. For instance, the NOC 508 may update software or firmware on the control panel 520. The NOC 508 may also monitor other aspects of the control panel 520, including its security-related functions. The NOC 508 may ensure that the control panel 520 is operating and communicating properly with ACs corresponding to the security system 542. When the security system 542 components detect a certain event (e.g., a security-related event such as a break-in, a fire, etc.), the ACs may communicate the information to the control panel 520. The control panel 520 optionally reviews the information and takes a prescribed action, such as initiating an alarm, performing a corrective action, notifying an administrator or user, etc. In the same or other embodiments, information from the security system 542 may be communicated through the network 502 to the NOC 508 for some review or action.

Accordingly, in accordance with various embodiments, the NOC 508 may monitor signals that are received by the control panel 520 from the various systems 532-546 of the security system 530. As another example, if camera of the door system 534 obtains a picture of a person at an entry of the building, the control panel 520 may provide the information to the NOC 508 using the network 502. The NOC 508 may then perform some function, including sending the image or notice about the image to a user of a remote device (e.g., computing devices 504, 506). Such information may, of course, also be performed by the control panel 520, or even the door security system 534, so that the NOC 508 is not involved in the communications. The NOC 508 and control panel 520 may therefore work together to collectively receive, interpret and take action based on signals from the security system 530, or the control panel 520 may take action without the NOC 508. The NOC 508, if involved, may also provide any number of other functions, and may be distributed among multiple devices, components or facilities.

As discussed above, the control panel 520 may in some embodiments be located at, or otherwise associated with, a particular location such as a residence or business. In contrast, the NOC 508 may be remote relative to such a location. At the respective locations, the control panel 520 may include a user interface (e.g., a display, a keypad, etc.) which users may use to operate, configure or otherwise interact with the control panel 520. In one example, a display at the control panel 520, may display images received from the door system 534 or notices of other events occurring within the security system 530. In the same or other embodiments, an electronic (e.g., computing) device 504, 506 may be used to interact with the control panel 520, and may be used to either provide input to or receive input from the control panel 520. For instance, the electronic devices 504, 506 may be remote from the control panel 520 and send or receive signals over the network 502. The signals may be sent to or from the control panel 520, optionally through the NOC 508, to control or monitor operation of the control panel 520 and the security system 530 so that manual operation at, or physical proximity to, the control panel 520, is not required. In other embodiments, the electronic devices 504, 506 may communicate directly with the control panel 520 without using the network 502 (e.g., by using an electronic device in sufficient proximity to allow a hardwired or wireless connection directly to the control panel 520).

The control panel 520 may monitor the operations of a number of different systems, components or appliances. Example systems and subsystems of the security system 530 are shown in FIG. 5, and may include communication, door imaging, entertainment, HVAC, lighting, security, sprinkler, telephone, or other systems within the location associated with the control panel 520. Such systems are merely illustrative and the control panel 520 may also be used in connection with other systems or components.

As a further example, the monitored automation components may include entertainment components such as televisions, recordable media players (e.g., DVD player, Blu-Ray Player, digital video recorders, VCR, set-top box, etc.), projectors, speakers, stereos, and the like, any or all of which may be separate from the control panel. In the same or other embodiments, a monitored system may include HVAC components such as thermostats, air conditioners, furnaces, temperature sensors, and the like, or controllers therefor. Monitored and/or controllable ACs may further include lighting system components such as light fixtures, switches, sensors (e.g., motion sensors), or additional components or controllers, or may include security system components including sensors or detectors (e.g., motion sensors, magnetic sensors, intrusion sensors, vibration sensors, infrared sensors, ultrasonic detectors, microwave detectors, contact sensors, photoelectric beam detectors, smoke detectors, temperature sensors, carbon monoxide detectors, etc.), video or still cameras, speakers, microphones, or other components. In embodiments where the monitored systems include a sprinkler system 544, the ACs may include valves, actuators, sensors (e.g., flow rate sensors, proximity sensors, etc.), sprinklers, pumps, and the like. In a similar manner, where one or more of the ACs are part of a telephone system, the ACs may include telephones, answering machines, call forwarding components, intercoms, and the like. Some or all of the ACs of the various systems 532-546 may also include wireless communication system components. As an example, the ACs may include routers, switches, access points, repeaters, bridges, and the like.

The system 500 of the present disclosure is implemented as a communication system in which the operations of electronic components may be monitored through communication links. As discussed herein, the communication links may be wired or wireless, or may include a combination of wired and wireless links, any or all of which may use different protocols or networks. Regardless of the particular mode of communication, the status or operation of devices and ACs may be reported to, or controlled using, the corresponding control panel 520, network operations center 508, or remote electronic device 504, 506. The monitored ACs of the security system 530 may therefore include a number of different types of components that provide or receive electronic signals of one or more different types.

By way of example, the control panel 520 may be equipped to use one or more different communication protocols in communicating with the ACs of the security system 530 and with the network 502, and such communication protocols may be implemented using any combination of one or more of wired or wireless communication. As an example, an example (communication) system 500 may include security components, of which one or more of the ACs may be a part. Such security components may operate using a wireless protocol or system that allows a mesh network to be formed. Each AC may, for instance, optionally be able to communicate with some or any other AC, provided they are in range of each other. If the ACs use a wireless system for communicating with the control panel 520, an AC that is in range of the control panel 520 may also send information to, or receive information from, the control panel 520. In some embodiments, the ACs communicate with each other and the control panel 520 using the same communication protocol. Although not intended to limit the scope of the present disclosure, an example communication protocol for such an embodiment may be a low power, short range wireless communication protocol (e.g., Z-Wave, ZigBee, etc.). In other embodiments, larger range wireless communication protocols (e.g., WiFi, LightwaveRF, etc.) may be used in addition to, or instead of, the shorter range alternatives. Such connections may also allow two-way communication or may provide only one-way communication. The imaging system 300 of FIG. 3 is one example of an AC in a door system, and the transmitter 326 may be used to communicate directly with a control panel or with other ACs as part of a mesh network.

The control panel 520 may also optionally communicate with the network 502 and/or the electronic devices 504, 506 using the same or other protocols. As an example, if the electronic device 504 is sufficiently close to the control panel 520, a physical connection may be used, or a suitable wireless communication protocol (e.g., Z-Wave, ZigBee, Bluetooth, WiFi, etc.) may be used.

The communication to the network 502 may also be made in any suitable manner, including using wireless or wired communication, or a combination thereof. For instance, as discussed herein, an example control panel 420 may communicate with a network 502 operating on a mobile telephone system. A GSM, CDMA, LTE, HSPA+, or other similar wireless communication component may therefore be included in the control panel 520 and the network 502 to allow for such communication. In other embodiments, the network 502 may have other forms to allow for alternative or additional types of communication between the network 502 and the control panel 520. Moreover, a NOC 508 may communicate with different control panels 520 of different automation systems, and potentially allow such control panels 420 to communicate with each other.

Figure 6:
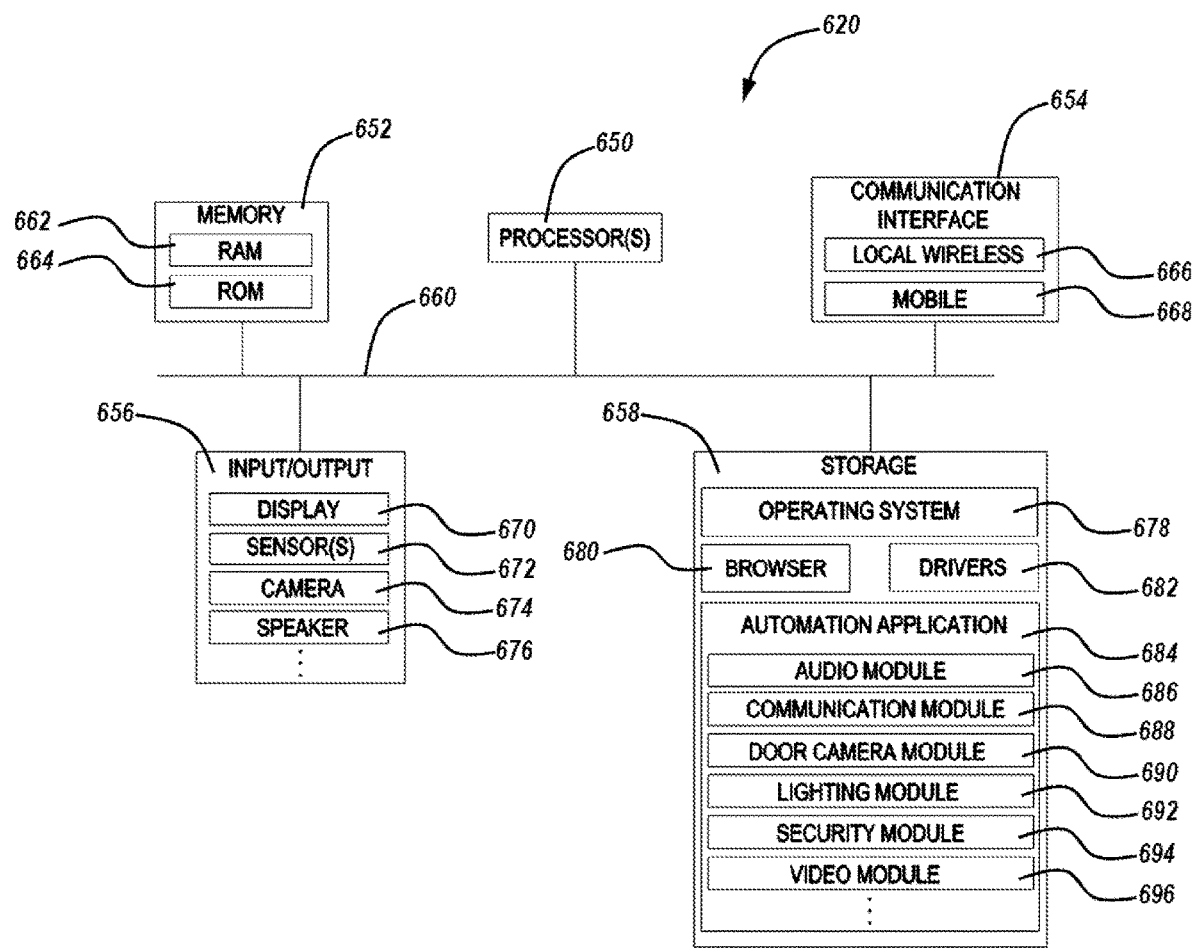
FIG. 6 is a schematic illustration of an example control panel that may be used to communicate with a door camera or other imaging system.

Turning now to FIG. 6, an example control panel 620 is schematically illustrated. It should be appreciated in view of the disclosure herein that the control panel 620 may be used in the system of FIG. 5 or in connection with any other system herein (including image capture systems as described herein). The illustrated control panel 620 is, however, merely illustrative, and may have fewer or additional components or elements other than those expressly described or illustrated, or may be used in connection with systems or components other than those of FIG. 5 or the image capture systems described herein.

In FIG. 6, the control panel 620 includes multiple components interacting together over one or more communication channels. In this embodiment, for instance, one or more processors 650 may communicate with input/output devices 656, a communication interface 654, memory 652 and/or a mass storage device 658 via a communication bus 660. The processors 650 may generally include one or more processing components, including a central processing unit, a graphics processing unit, or the like, any of which may be capable of executing computer-executable instructions received or stored by the control panel 620.

The processors 650 may communicate with the communication interface 654 using the communication bus 660. The communication interface 654 may receive or send communications via one or more networks (e.g., networks 502 of FIG. 5) or otherwise communicate with other components or devices (e.g., image capture system 300 of FIG.

3, cameras 422 of FIGS. 4A-4C, door security system 530 of FIG. 5, etc.). Received communications may be provided over the communication bus 660 and processed by the processors 650.

In the particular embodiment illustrated in FIG. 6, the communication interface 654 may include multiple components to allow communication via one or more different protocols. For instance, the illustrated embodiment includes an interface component 666 for connecting to local components, such as over a wireless mesh network. As discussed herein, an example of the interface component 666 may include radio which operates using Z-Wave, ZigBee, or other protocols, or some combination thereof. Such a component may specifically be used to communicate with security or other automation system components for a home or other structure, including one or more sensors, cameras, controllers, and the like.

In still another example embodiment, an example communication interface 654 may include an interface component 668 for communicating over a mobile telephone network. An example network may include, for instance, GSM, CDMA, LTE, HSPA+, or other communication typically used by a wireless carrier to communicate with a mobile device such as a telephone or tablet computing device. As discussed herein, in one example embodiment, the interface component 668 may be provided to facilitate communication between the control panel 620 and a network operations center (e.g., NOC 508 of FIG. 5).

In still another embodiment, the communication interface 654 may include other components. For instance, an example wireless interface component 666 may be used in providing other wireless communication. An example wireless component 666 may be used to send and/or receive communications over a wireless protocol such as WiFi (i.e., IEEE 802.11), Bluetooth, or some other protocol. Moreover, according to some embodiments as disclosed herein, the wireless component 666 may be configured to allow the control panel 620 to function as a wireless access point.

According to some embodiments, the control panel 620 may further include one or more input/output devices 656. In FIG. 4, the input/output devices 656 may communicate with one or more processors 650 using the communication bus 660. Any suitable type of input/output device may be provided. For instance, a control panel 620 may include buttons, keypads, or the like through which input is received from a user. A display 670 may also be provided and used as an output to display information to a user. In some embodiments, the display 670 may also act as an input. For instance, the display 670 may be a touch-sensitive display allowing a user to touch the display 670 to make a selection, to provide input through a gesture, or to otherwise provide input. Still other types of input or output devices may include a camera 674, audio devices such as a microphone or a speaker 676, one or more sensors 672, ports, or other elements or some combination thereof. The illustrated input/output devices 656 of a control panel 620 are merely illustrative. In other embodiments, for instance, trackball, mouse, biometric reader (e.g., iris scanner, fingerprint reader, etc.), GPS device, or other component, or some combination of the foregoing, may be included.

The control panel 620 may also include memory 652 and mass storage device 658. In general, the memory 652 may include one or more of persistent and non-persistent storage, and in the illustrated embodiment the memory 652 is shown as including random access memory 662 and read only memory 664. Other types of memory or storage may also be included.

The mass storage device 658 may generally be comprised of persistent storage in a number of different forms. Such forms may include a hard drive, flash-based storage, optical storage devices, magnetic storage devices, or other forms which are either permanently or removably coupled to the control panel 620. In some embodiments, an operating system 678 defining the general operating functions of the control panel 620, and which is executed by the processors 650 may be stored in the mass storage device 658. Other components stored in the mass storage device 658 may include drivers 682 (e.g., to facilitate communication between the processors 650 and the input/output devices 656 and/or components of the communication interface 654), a browser 680 (e.g., to access or display information obtained over a network, including mark-up pages and information), and application programs.

Application programs may generally include any program or application that may be used in the operation of the control panel 620. Examples of application programs may include applications specifically designed for use with a security and/or automation system (e.g., automation application 684), or more general use applications. Examples of more general use applications may include word processing applications, spreadsheet applications, games, calendaring applications, weather forecast applications, sports scores applications, and other applications.

As shown in FIG. 6, in at least one embodiment, the automation application 684 may include modules or components capable of being used by the control panel 620 in connection with a security or automation system. For instance, the automation application 684 may include an audio module 686. Such a module may generally be used to control how one or more audio systems of a residence or commercial building operate. As an example, an intercom system may be provided at an entry to the building, and the audio module may monitor communications and potentially be used in passing the communications (e.g., using a speaker or sending communications to a remote device). The audio module 686 may therefore operate alone or potentially in concert with a communication module 688 in such a setting. The communication module 688 may similarly be configured to facilitate audio and potentially visual communications. Moreover, the communication module 688 may be used to determine when to communicate at all. Of course, the communication module 688 may be used without the audio module 686 in some applications and/or the audio module 686 may also be used for other purposes, including entertainment. By way of example, if the control panel 620 is used in connection with an automation system that includes a television, speaker system, or the like, the audio module 686 may be used to monitor or control volume levels, sound settings, locations where sound is provided, or the like.

The illustrative automation application 684 is also shown as including a door camera module 690, which may also be referred to as an image capture module. The door camera module 690 may generally be provided for monitoring functions at an entry to a residence, office, or other structure, and may include instructions for performing the various functions described herein. As an example, the door camera module 690 may be used to determine when to activate a remote camera (e.g., by detecting presence of a person at an entry), to review captured image data (e.g., perform facial recognition, compare the image against a database of known/unknown persons), to provide the image to the display 670 or a remote device (e.g., in response to determining that the image data satisfies some criteria and emails or otherwise sends the image to an owner, resident, or the like), or to perform other functions, or some combination thereof.

An additional application or module within the automation application 684 may include a lighting module 692. The lighting module 692 may monitor, control or otherwise interface with lighting components including switches, lighting fixtures, and the like. In some embodiments, such as where a light is provided at an entry way, the lighting module 692 may interface with sensors used to detect the presence of a person (e.g., a motion sensing light), and can interface with the door camera module 690 to capture or review image data. The lighting module 692 may also be used to perform other functions (e.g., automatically turn on a light in response to a trigger event).

The modules 694, 696 may provide similar functions, but for different or additional systems monitored using the control panel 620. By way of example, a security module 694 may control, monitor, or interface with security-related components such as intrusion detection components, cameras, global positioning system (GPS) components, and safety components (e.g., fire, flood, carbon monoxide or radon detectors), as well as potentially other modules of the automation application 684. A video module 696 may be used in connection with video functions within a security and/or automation system. The video module 696 may monitor video feeds from security cameras, collect video data at an entry to a building, provide two-way video communication services, interface with video entertainment devices, or provide other video-related functions, or any combination of the foregoing.

The modules shown in FIG. 6 as part of the automation application 684 are purely provided to illustrate the variety of different types of modules that may be included, and are not intended to be an exclusive list. In other embodiments, for instance, additional modules may include an HVAC module (e.g., to control, monitor or interface with thermostats, air conditioners, furnaces, hot water heaters, etc.), a sprinkler system module (e.g., to verify water flow rates at one or more locations, turn sprinklers on or off, etc.), a telephone module (e.g., to interface with a telephone system and potentially run telephone calls through the control panel, to forward calls, etc.). Another example module could include a remote access module. Such a module could, for instance, enable the control panel 620 to be accessed using remote devices (e.g., devices 504, 506 of FIG. 5), and to potentially have communications relayed through the control panel 620 either from or to the remote device. Thus, a user of a remote device could potentially set or view communications, door cameras, entertainment, lighting, security, HVAC, sprinkler, telephone, or other settings remotely, or even receive or otherwise monitor audio or video feeds from a remote location. Of course, the automation application 684 may also include additional or other modules or components, including authentication, settings, preferences, emergency override, updating, and other modules.

Figure 7:
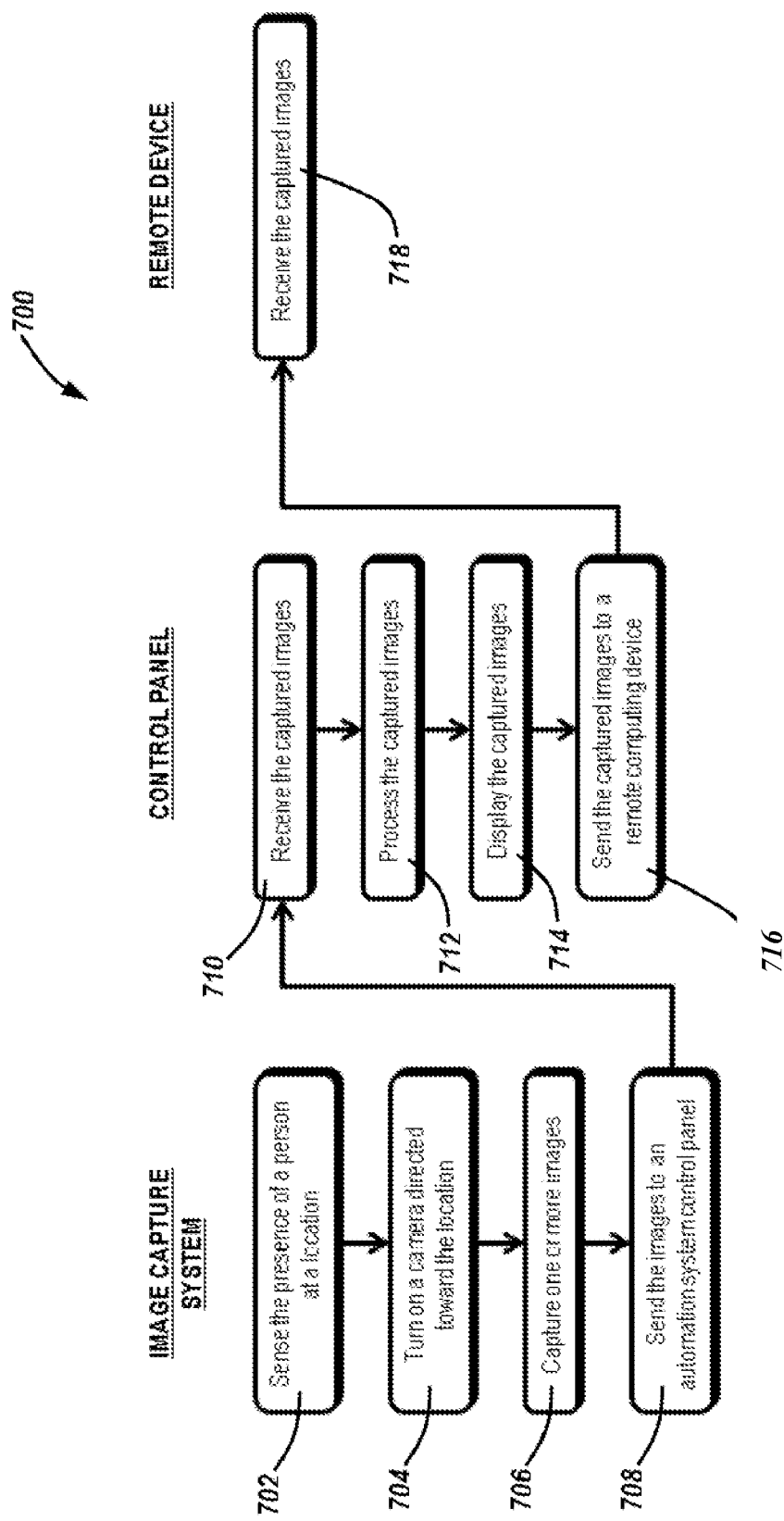
FIG. 7 illustrates an example method for capturing an image at an access point to a building or other location and providing the captured image to a remote device and/or control panel.
Figure 8:
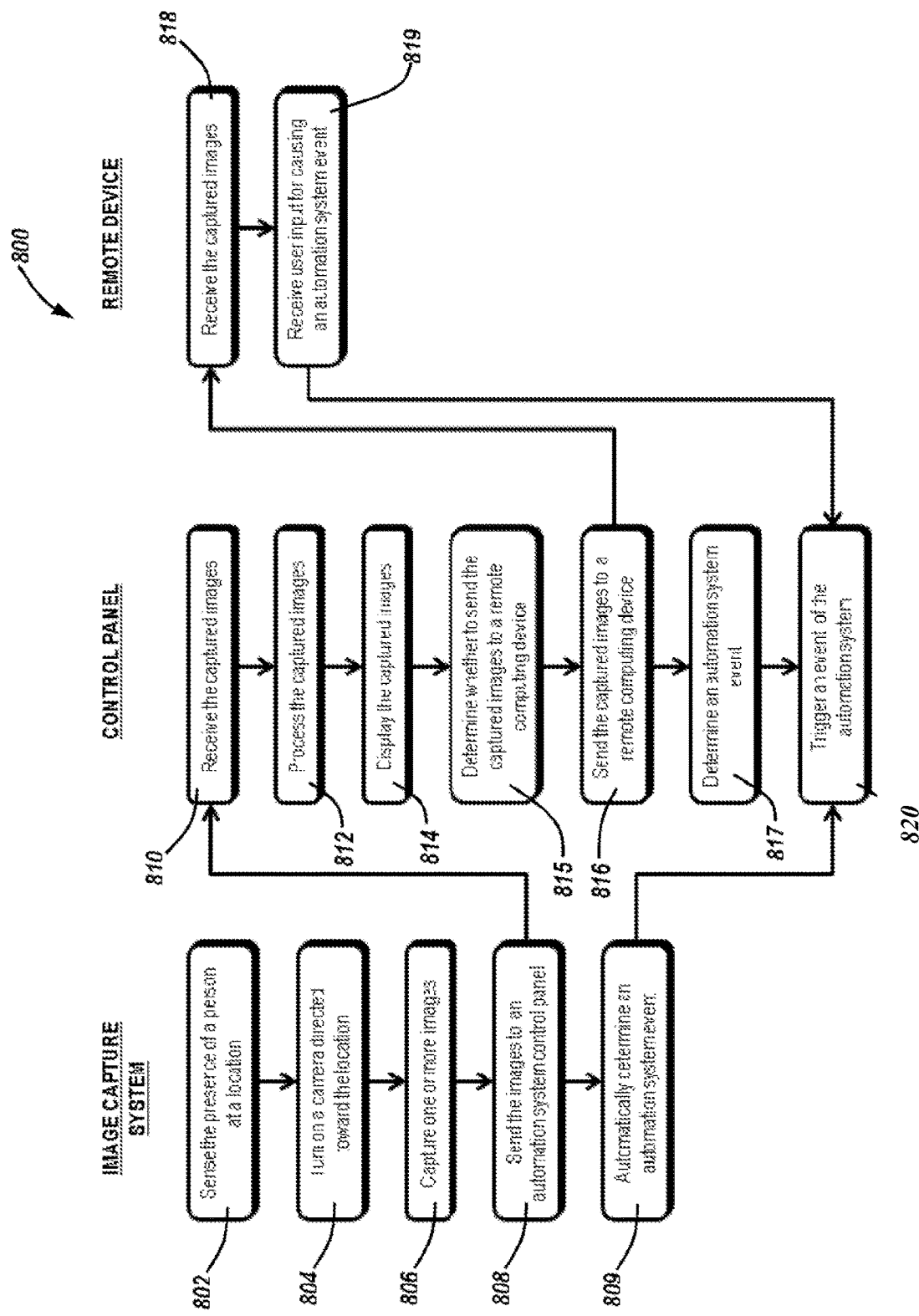
FIG. 8 illustrates an example method for capturing an image at an access point and triggering a response within an automation system.
Figure 9:
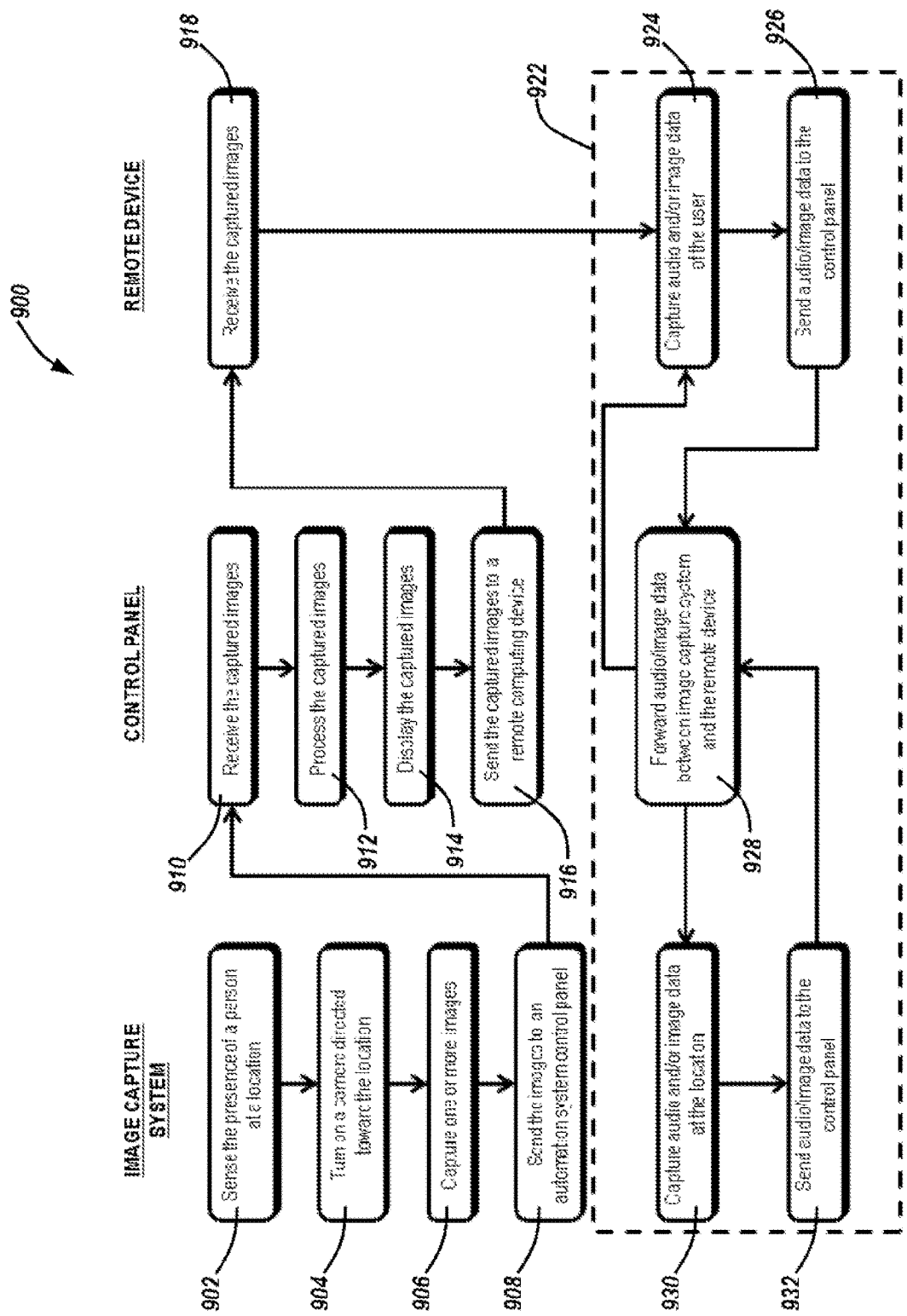
FIG. 9 illustrates an example method for capturing an image at an access point to a building or other location and initiating a communication system with a person identified using the image capture system.

Turning now to FIGS. 7-9, various methods are provided which allow an imaging system to be provided at an access to a physical structure, and which allow imaging data to be transferred to a remote user and/or a control panel. It should be appreciated that the illustrated methods are purely illustrative as to the acts or steps in the methods as well as the devices or locations at which such acts or steps are performed.

With reference now to FIG. 7, an example method 700 for monitoring an access point to a physical structure is illustrated. In the example method, an image capture system, automation system control panel, and remote computing device, or some sub-combination thereof, may be utilized. Examples of the various elements may be found in FIGS. 1-6. For instance, an image capture system may be positioned in a lock, door handle, peephole, lighting, doorbell, window, or other location as discussed herein. The components of the image capture system may vary, and may be wholly or partially interior or exterior to an access structure such as a door or window. In some embodiments, processing may take place at the image capture system, while other embodiments may contemplate processing that occurs at the control panel and/or remote computing device.

In this particular embodiment, an image capture system may be used to sense the presence of a person at a particular location (block 702). As discussed herein, some embodiments contemplate the location as being at or near an access point to a physical structure. The manner in which the presence of the person is sensed may vary. For instance, an image capture system may include a motion detector. If sufficient motion, or a particular type of motion, is detected within range of the motion detector, the sensor may determine that a person is present. In other embodiments, a pressure sensor, vibration or acoustic sensor, or other sensor may be used. Further still, in another embodiment, an existing component such as a doorbell or door knocker may be used to determine someone is present. In yet another embodiment, a person's presence may be detected by determining when an access point (e.g., a door or window) is opened.

Regardless of the manner in which the presence of a person is determined, the image capture system may have a camera thereof turned on (block 704) and be used to capture one or more images of the location (block 706) where it is detected that a person is likely present. The image data that is captured in block 706 may be of any number of types, and may include photographic, video, infrared, thermal, or other types of image data. Of course, in some embodiments, the camera may be on at all times, in which case block 704 may be unnecessary, or may be modified to include merely changing a focus or orientation of the camera to capture a desired location.

When image data is captured, it may be stored by the image capture system in some embodiments. In the same or other embodiments, image data may also be sent to a separate component. In block 708, for instance, the images may be sent to an automation system control panel, although forwarding data to a control panel is merely illustrative. In other embodiments, for instance, the image data may be forwarded directly to a different device (e.g., a mobile computing device of a user).

Image data that is sent to the control panel may be received (block 710) and potentially processed (block 712). Processing the captured image data in block 712 may include any number of aspects. As discussed herein, for instance, processing the captured images may include determining a content of the images. In one embodiment, the image data is run through a recognition system (e.g., facial recognition). If a face is detected, processing the captured images in block 712 may include determining who the person is, whether the person is on an approved list of visitors (or conversely an unapproved list), or the like. Recognition may include detecting other aspects. For instance, if a delivery person is there to deliver an item, an insignia, symbol, or the like on the person's clothing may be detected to identify the delivery company. Further still, recognition of the image may be used to determine whether or not a person is present at all. By way of example, images that capture people (or different people) may be classified differently than images that merely capture animals (e.g., a pet dog or cat) or other subjects. Processing the data in block 712 may also include other aspects, such as adding a timestamp to an image.

Data received and optionally the control panel may also be displayed by the control panel (block 714). In such an embodiment, the control panel may include a display element for displaying the still image, video image, or some other type of image. Whether or not displayed, the captured image(s) may be sent to a remote computing device in block 716. The remote computing device may then receive the captured images (block 718). Once received, the user of the remote device (e.g., a mobile phone, a tablet computing device, an office computer, etc.) may view the images. Of course, instead of, or in addition to, sending the image itself, the remote device may also receive other or additional information. By way of example, where the image data is processed in block 712 to determine who or what is in the image, a text message or email could be sent simply providing information on who is present at the location (e.g., "The FEDEX™ deliveryman is at your door.") Notifications may also be provided to indicate that someone is present, but requiring the user to access an image from a third party. Captured images may, for instance, be uploaded by the image capture system or the control panel to a hosting service, and a notification may provide a URL or other address for accessing the image.

FIG. 8 illustrates another example embodiment of a method 800 for capturing an image of a subject at a particular location, and includes an act of sensing a presence at a location (block 802). Often that presence may include a person at an entry to a fixed physical structure, but could include other elements (e.g., a person next to a mobile phone, etc.). If a camera of the image capture system is turned off, the camera may then be turned on and/or directed to the location where the person or other subject is located (block 804), and one or more images may be captured (block 806). Captured images may then be sent to a remote computing device or, in the embodiment in FIG. 8, to a control panel for an automation system (block 808). In some embodiments, capturing images in block 806 may include, or be replaced by, capturing audio information. Block 808 could then include sending the captured audio instead of, or in conjunction with, the captured still, video, or other images.

Images sent to the control panel may be received (block 810) and optionally processed (block 812). Processing the images may include various acts or processes, as discussed herein or as would be appreciated by a person having ordinary skill in the art in view of the disclosure herein. If the control panel has a display device, the images may be displayed on the control panel (block 814). The images (or potentially a notification of another type) may also be forwarded to a mobile device, a computer, a tablet, or some other remote computing device (block 816) which then receives the images (block 818). The user may then retrieve the captured images from the remote device or another location to see who or what is at the access point to a physical structure or at such other location as is monitored in block 802.

The method 800 of FIG. 8 may further include causing some automation system event to occur at least partially on account of the image data that is captured. That such an event should occur may result from a determination made by the image capture system (block 809), the control panel (block 817) or the remote computing device (block 819). For instance, if the image capture system as processing capabilities, the image capture system may be able to determine that some automation system event (e.g., doors may lock or unlock, doorbell may automatically sound, alarm may turn on or off, lights may turn on or off, etc.) may be desired. The event may be dependent or independent of the subject of the image. Thus, a light may turn on if any person is detected, while doors may automatically be unlocked if a particular person is identified. When the event is determined, the image capture system may notify the control panel which may then trigger the event (block 820). In other embodiments, triggering of the event in block 820 may be initiated by a user of the automation system. For instance, if image data is provided to a control panel, mobile device, or other remote device of the user, the user may recognize the person at the door or other location. In that event, the user could remotely request that the security system be disarmed, that a door be locked, or the like. In block 820, the requested action could then be triggered and taken.

The remote device that receives images or notifications corresponding to the images may also request some action. For example, if a user is sent a picture that shows a person at the door of his home, the user may be able to see who the person is. Depending on who that person is, the user may request that some action be taken (e.g., lock the door, unlock the door, turn on a light, arm or disarm an alarm, etc.) by providing an indication of the action at the remote computing device. Regardless of the particular action to take, when the event is determined, the remote computing system may notify the control panel which may then trigger the event (block 820).

Of course, actions may also be determined at the control panel itself (block 817). Actions determined by the control panel may be based on the content of the image or the type of detection made (block 802), or based on any other factor, or even be the same for all conditions. For instance, if a person is detected and an image is taken, the control panel may determine in block 817 that a light should be turned on. If, however, processing the image (block 812) indicates a particular person, additional or other actions may be determined. If the image shows the owner of the location, the doors could potentially automatically unlock, although a host of other events could occur for any of myriad reasons. Once an action is determined by the control panel in block 817, the control panel may also trigger the event in block 820 by sending appropriate signals to the image capture system or other home automation system component as appropriate.

FIG. 9 illustrates yet another embodiment of a method 900 for selectively capturing image data, and also includes establishing a communication session with the subject of the captured images. To avoid duplication, some aspects of the method 900 are similar to those discussed in FIGS. 7 and 8, although the presence of similar acts or steps should not be interpreted as a requirement that such acts or steps be included in all methods. Rather, an act or step is required only if specifically identified as being essential for all embodiments.

In the method 900 of FIG. 9, a person's presence may be sensed at a particular location (block 902). In response, a camera of an image capture system may be turned on and/or reoriented (block 904) to capture one or more images of the person (block 906). The captured images may then be sent (e.g., to a control panel of an automation system in block 908). Images may be received by a user of a remote computing device (block 918) either as addressed directly by the image capture system, or as passed through a control panel. In FIG. 9, the control panel may forward the images (block 916), and may also receive the images (block 910), process the images (block 912), and display the images (block 914).

When the remote computing device receives the image data, a communication session (922) may be established. As part of establishing the communication session 922, the user of the remote device may request that the session be established. Audio and/or image (e.g., photographic or video) data may then be captured of the user of the remote device at block 924. The audio and/or image data may be sent to another device, including the control panel (block 926), although the control panel could be bypassed to allow communication directly to an intercom, image capture system, or the like.

In this embodiment, where the audio and/or image data is captured, the control panel may receive the data and forward the data to the image capture system (block 928). In such an embodiment, the image capture system may include a speaker or other audio output element, a display device, or other component that allows the audio and/or image data of the user of the remote device to be output to the person whose presence is detected at the particular location. Optionally, audio and/or image data of the person at the location may also be captured (block 930) and sent to the control panel (block 932) or another location to allow two-way communication within communication session 922. The control panel may then also forward audio and/or image data of the person at the location to the user of the remote computing device (block 928). In such an embodiment, the control panel may therefore facilitate two-way communication, with such communication potentially occurring in real-time.

One aspect of the method 900 of FIG. 9 is the ability of a person to not only monitor in real-time the access points to a particular structure, but to also communicate with people who may be at the access points. Further, such real-time communications may occur without the person at the structure even being aware whether or not the other participant is at the location or not. A person could, for instance, be located within a building and receive an image of who is at the door (e.g., on a mobile phone, tablet, or at the control panel). Without going to the door or even moving, the user could determine whether or not to answer the door or perform some other function (e.g., unlock or open the door). By using the remote computing device, the user could request an automation system event that makes the function occur (see FIG. 8). Additionally, the user could initiate a communication session. The user of the remote computing device may, for instance, see who is at the door and ask what is wanted, request that a package be left at the doorstep, or the like. The user could be in the building or thousands of miles away, yet the communication may give the appearance of being right inside.

While FIGS. 7-9 illustrate example embodiments in which the control panel, image capture system, and remote device carry out particular acts, such embodiments are merely illustrative. As an example, an act of sensing the presence of a person at a location may be performed outside of the image capture system. For instance, a motion detector may be separate from an imaging system, and potentially use different communication links to communicate with the control panel, or possibly even to communicate with each other or the remote computing device. In such an embodiment, the motion sensor could potentially detect a person and notify the control panel, and the control panel could then turn on the camera (or reorient the camera) without the detection occurring by the image capture system itself.

In another embodiment, processing of image data may occur outside of the control panel. For instance, the image capture system itself may include some processing capability. Thus, the image capture system may be able to determine who or what is in the image, what event should be triggered on account of the image, or even whether or not to send the image. Indeed, whether the image is processed at the image capture system, the control panel, or some other device, some or all images may not even be forwarded to the remote device. As an example, the user may only want to receive images of certain people, or people who are not known. In such a case, a facial recognition system may be used, and only images identified as including those specific people (or unknown people) may be forwarded on. A user may use the imaging system or control panel to specify where and when to send images, or may do so using the remote computing device.

Figure 10:
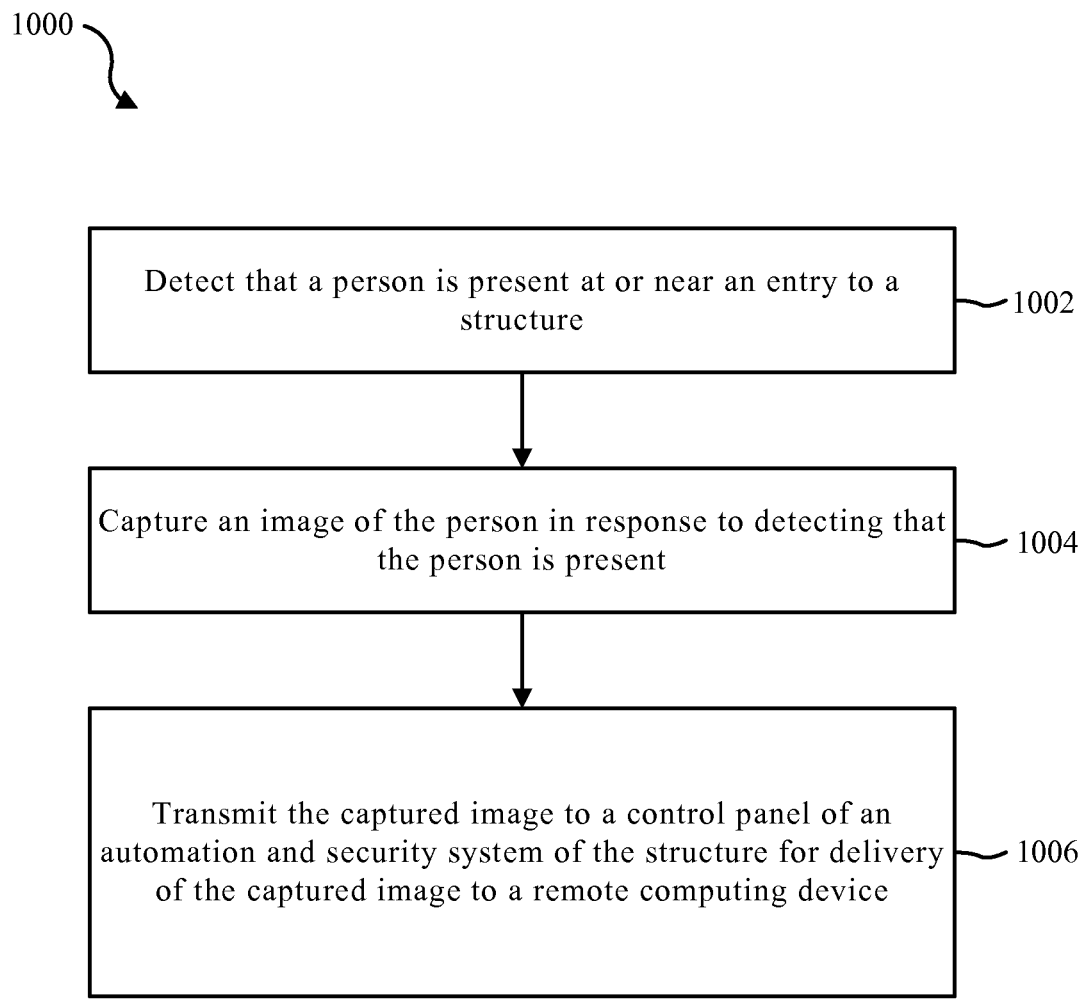
FIG. 10 is a flow diagram illustrating a method for monitoring an entry to a structure.

FIG. 10 is a flow diagram illustrating one example of a method 1000 for monitoring an entry to a structure. In some configurations, the method 1000 may be implemented by the system 500 shown in FIG. 5, or any of the other systems, methods and devices shown in FIGS. 1-9. At block 1002, the method 1000 includes monitoring an entry to a structure includes detecting that a person is present at or near an entry to a structure. Block 1004 includes capturing an image of the person in response to detecting that the person is present. Block 1006 includes transmitting the captured image to a control panel of an automation and security system of the structure for delivery of the captured image to a remote computing device.

Method 1000 may also include detecting that the person is present may include at least one of sensing motion at or near the entry to the structure, sensing a pressure on a handle of an access element at or near the entry, sensing vibration at or near the entry, sensing sound at or near the entry, and sensing activation of a doorbell at or near the entry. The access element may be a door or window. Method 1000 may include turning on a camera in response to detecting that a person is present at or near the entry, the camera being operable to capture the image. The access element may include at least one of a handle, a lock, a light fixture, a doorbell, a peephole, and a window. Capturing the image may include operating a camera, the camera being integrated into an access element component at the entry. The camera may be arranged to be inconspicuous. Capturing the image may include operating a camera, the camera being part of an image capture system extending through a door at the entry. The image capture system may include a camera, a power supply, and a transmitter. The camera may include a lens exterior to the door, and the power supply and transmitter may be interior to the door. Method 1000 may include processing the captured image to at least one of detect an identity of the person, detect a category of the person, or timestamp the image.

Figure 11:
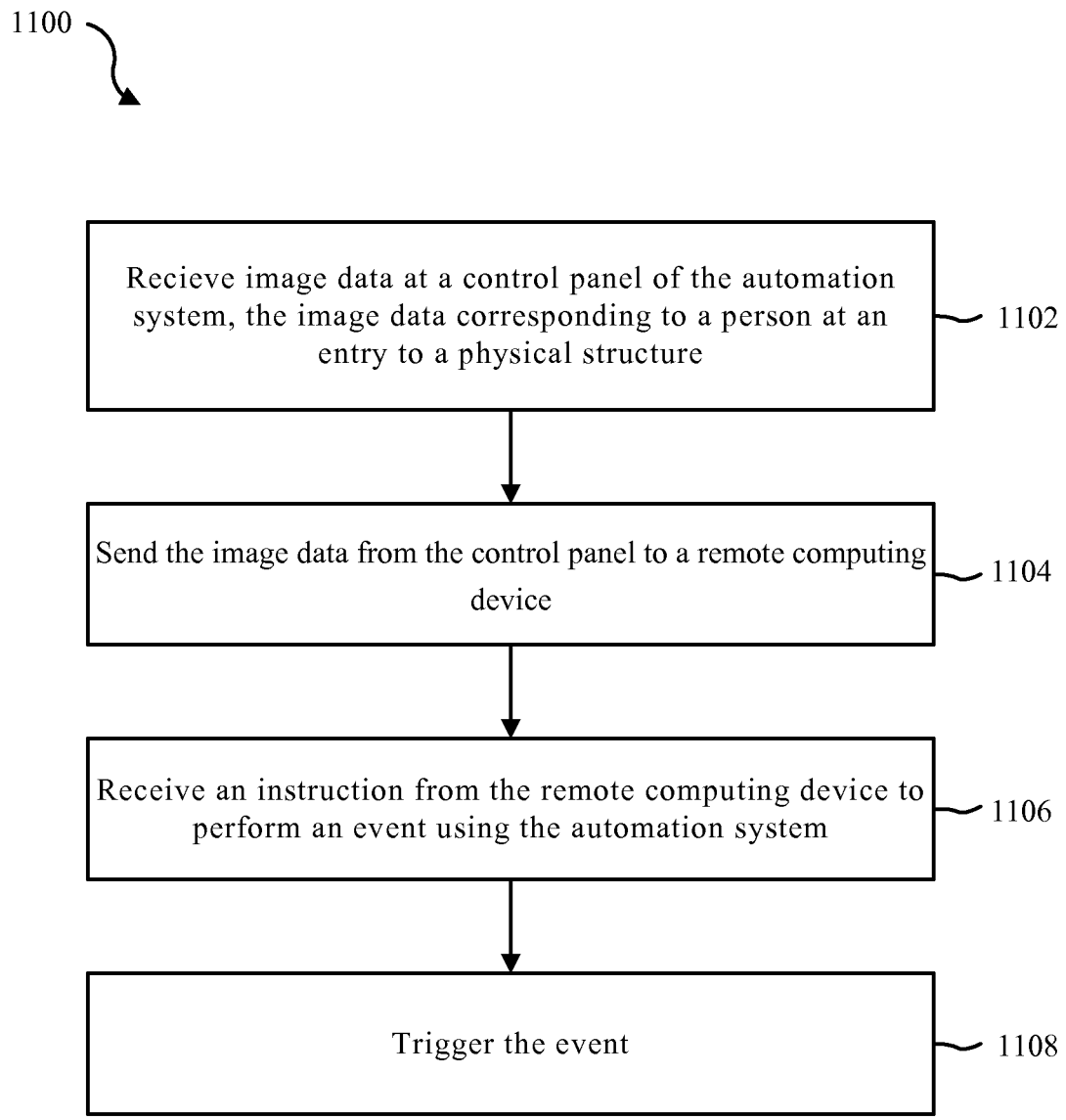
FIG. 11 is a flow diagram illustrating a method for monitoring an entry to a structure using a control panel of an automation system.

FIG. 11 is a flow diagram illustrating one example of a method 1100 for monitoring an entry to a structure using a control panel of an automation system. In some configurations, the method 1100 may be implemented by the system 500 shown in FIG. 5, or any of the other systems, methods and devices shown in FIGS. 1-9. At block 1102, the method 1100 includes receiving image data at a control panel of the automation system, the image data corresponding to a person at an entry to a physical structure. Block 1104 includes sending the image data from the control panel to a remote computing device. Block 1006 includes receiving an instruction from the remote computing device to perform an event using the automation system. Block 1008 includes triggering the event.

Method 1100 may also include triggering the event may include at least one of establishing a communication session between a mobile wireless device and a communication system at the entry, turning a light on or off at the physical structure, locking or unlocking a door of the physical structure, turning an alarm on or off at the physical structure, and arming or disarming a security system at the physical structure. Receiving an instruction from the remote computing device to perform an event using the automation system may include receiving audio or video data from a mobile wireless device, and triggering the event may include sending the audio or video data to a communication system at the entry of the physical structure. Method 1100 may include automatically determining a content of the image data. Automatically determining the content may include performing facial recognition. Method 1100 may include sending the image data to the remote computing device only when the content satisfies predetermined criteria.

Embodiments of the present disclosure may comprise or utilize a special purpose or general-purpose computer including computer hardware, such as, for example, one or more processors and system memory. Embodiments within the scope of the present disclosure also include physical and other computer-readable media for carrying or storing computer-executable instructions and/or data structures. Such computer-readable media may be any available media that may be accessed by a general purpose or special purpose computer system. Computer-readable media that store computer-executable instructions are physical storage media. Computer-readable media that carry computer-executable instructions are transmission media. Thus, by way of example, and not limitation, embodiments of the disclosure may comprise at least two distinctly different kinds of computer-readable media, including at least computer storage media and/or transmission media. Computer-readable media that includes computer-executable instructions may also be referred to as a computer program product.

Examples of computer storage media include RAM, ROM, EEPROM, CD-ROM or other optical disk storage, magnetic disk storage or other magnetic storage devices, flash-based storage, solid-state storage, or any other non-transmission medium which may be used to store desired program code means in the form of computer-executable instructions or data structures and which may be accessed by a general purpose or special purpose computer.

When information is transferred or provided over a communication network or another communications connection (either hardwired, wireless, or a combination of hardwired or wireless) to a computing device, the computing device properly views the connection as a transmission medium. A "communication network" may generally be defined as one or more data links that enable the transport of electronic data between computer systems and/or modules, engines, and/or other electronic devices, and transmissions media may include a communication network and/or data links, carrier waves, wireless signals, and the like, which may be used to carry desired program or template code means or instructions in the form of computer-executable instructions or data structures within, to or from a communication network. Combinations of storage media and transmission media should also be included within the scope of computer-readable media.

Further, upon reaching various computer system components, program code means in the form of computer-executable instructions or data structures may be transferred automatically from transmission media to storage media (or vice versa). For example, computer-executable instructions or data structures received over a network or data link may be buffered in RAM within a network interface module (e.g., a "NIC"), and then eventually transferred to computer system RAM and/or to less volatile computer storage media at a computer system. Thus, it should be understood that computer storage media may be included in computer system components that also (or even primarily) utilize transmission media.

Computer-executable instructions comprise instructions and data which, when executed at a processor, cause a general purpose computer, dedicated or special purpose computer (e.g., an automation system control panel), or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above, nor performance of the described acts or steps by the components described above. Rather, the described features and acts are disclosed as example forms of implementing the claims.

Those skilled in the art will appreciate that the embodiments may be practiced in network computing environments with many types of computer system configurations, including, personal computers, desktop computers, laptop computers, message processors, hand-held devices, programmable logic machines, multi-processor systems, microprocessor-based or programmable consumer electronics, network PCs, tablet computing devices, minicomputers, automation system control panels, network operations centers, mainframe computers, mobile telephones, PDAs, pagers, routers, switches, and the like.

Embodiments may also be practiced in distributed system environments where local and remote computer systems, which are linked (either by hardwired data links, wireless data links, or by a combination of hardwired and wireless data links) through a network, both perform tasks. In a distributed computing environment, program modules may be located in both local and remote memory storage devices.

Those skilled in the art will also appreciate that embodiments of the present disclosure may be practiced in special-purpose, dedicated or other computing devices integrated within or particular to a particular residence, business, company, government agency, or other entity, and that such devices may operate using one or more network, wireless, hardwire, or other connections, or any combination thereof. Examples may include residential or commercial buildings in connection with security or other automation systems configured to monitor local conditions (i.e., within a specific range of the building), remote conditions (i.e., accessible regardless whether within a particular range), or some combination thereof.

Although the foregoing description contains many specifics, these should not be construed as limiting the scope of the disclosure or of any of the appended claims, but merely as providing information pertinent to some specific embodiments that may fall within the scopes of the disclosure and the appended claims. Various embodiments are described, some of which incorporate differing features. Any feature illustrated or described relative to one embodiment is interchangeable and/or may be employed in combination with features of any other embodiment herein. In addition, other embodiments may also be devised which lie within the scopes of the disclosure and the appended claims. The scope of the disclosure is, therefore, indicated and limited only by the appended claims and their legal equivalents. All additions, deletions and modifications to the disclosure, as disclosed herein, that fall within the meaning and scopes of the claims are to be embraced by the claims.

The process parameters and sequence of steps described and/or illustrated herein are given by way of example only and may be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present systems and methods and their practical applications, to thereby enable others skilled in the art to best utilize the present systems and methods and various embodiments with various modifications as may be suited to the particular use contemplated.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising." In addition, the term "based on" as used in the specification and the claims is to be construed as meaning "based at least upon."

What is claimed is:

1. A computer-implemented method for monitoring an entry to a structure, comprising:
   detecting, using data received from a motion sensor, that a person is present at or near the entry to the structure for a period of time and a physical action being performed by the person on the entry;
   activating a camera based at least in part on determining the person has been present at or near the entry for the period of time, the camera being partially exterior to and integrated with a physical component, the physical component comprising an illumination source exterior to the entry to the structure, wherein the camera is part of an image capture system extending from an interior of the physical component to an exterior of the physical component, wherein the image capture system uses a power supply of the illumination source exterior to the entry of the structure that is different than a second power supply of a control panel located at the structure;
   capturing an image of the person, using the camera partially exterior to and integrated with the physical component exterior to the entry to the structure that comprises the illumination source, based at least in part on detecting that the person is present for the period of time and the detected physical action;
   transmitting data associated with the image from the camera to a component of the image capture system within the interior of the physical component;
   comparing the image of the person to a database of images of persons associated with the structure based at least in part on transmitting the data to the component of the image capture system within the interior of the physical component;
   identifying an identity of the person based at least in part on the comparing;
   automatically triggering a lighting system of a home automation system to change a state of one or more illumination sources at the structure based at least in part on the identity of the person and a setting of the home automation system;
   generating a message based at least in part on the identity of the person associated with the captured image indicating an unknown person;
   determining that an occupant associated with the structure is located remotely from the structure;
   bypassing displaying the message at the control panel located at the structure based at least in part on determining that the occupant is located remotely from the structure;
   transmitting the message to a remote computing device based at least in part on bypassing displaying the message at the control panel;
   receiving data from the remote computing device in response to transmitting the message to the remote computing device and bypassing displaying the message at the control panel, the message comprising image data or video data; and
   establishing a real-time multimedia communication session, between the remote computing device and a communication system associated with the entry, to communicate with the person present at or near the entry to the structure based at least in part on the received data from the remote computing device.

2. The method of claim 1, wherein detecting that the person is present includes at least one of:
   sensing a pressure on a handle of an access element at or near the entry;
   sensing vibration at or near the entry;
   sensing sound at or near the entry; and
   sensing activation of a doorbell at or near the entry.

3. The method of claim 2, wherein the access element is a door or window.

4. The method of claim 2, wherein the access element includes at least one of:
   a handle;
   a lock;
   a light fixture;
   a doorbell;
   a peephole; or
   a window.

5. The method of claim 1, wherein capturing the image includes operating the camera, the camera being integrated with an access element component at the entry.

6. The method of claim 5, wherein a portion of the camera is arranged to be within the access element component.

7. The method of claim 1, wherein capturing the image includes operating the camera, wherein the image capture system extends through a door at the entry.

8. The method of claim 7, wherein the image capture system includes:
the camera;
and
a transmitter.

9. The method of claim 8, wherein the camera includes a lens exterior to the door, and wherein the transmitter is interior to the door.

10. The method of claim 1, further comprising:
processing the captured image to at least one of:
detect a category of the person; or
timestamp the image.

11. A computer-implemented method for monitoring an entry to a structure using a control panel of an automation system, comprising:
receiving image data at the control panel of the automation system, the image data corresponding to a person determined to be present at or near the entry to the structure, the image data being captured by activating a camera based at least in part on determining the person has been present at or near the entry for a period of time, wherein the control panel is located at the structure and the camera is partially exterior to and integrated with a physical component, the physical component comprising an illumination source exterior to the structure, wherein the camera is part of an image capture system extending from an interior of the physical component to an exterior of the physical component and the image data is transmitted to the control panel from the image capture system exterior of the physical component, wherein the image capture system uses a power supply of the illumination source exterior to the entry of the structure that is different than a second power supply of the control panel located at the structure;
comparing the image of the person to a database of images of persons associated with the structure based at least in part on the image data being transmitted to the control panel from the image capture system within the interior of the physical component structure that comprises the illumination source;
identifying an identity of the person based at least in part on the comparing;
automatically triggering a lighting system of a home automation system to change a state of one or more illumination sources at the structure based at least in part on the identity of the person and a setting of the home automation system;
determining a user preference based at least in part on the identifying;
generating a message based at least in part on determining that the identity of the person associated with the captured image satisfies the predetermined user preference, the predetermined user preference indicating an unknown person;
determining that an occupant associated with the structure is located remotely from the structure;
bypassing displaying the message at the control panel located at the structure based at least in part on determining that the occupant is located remotely from the structure;
sending the message from the control panel to a remote computing device based at least in part on bypassing displaying the message at the control panel;
receiving an instruction from the remote computing device in response to the sending to the remote computing device and bypassing displaying the message at the control panel, the message comprising image data or video data; and
establishing a real-time communication session, between the remote computing device and a communication system associated with the entry, to communicate with the person present at the entry based at least in part on the received instruction.

12. The method of claim 11, further comprising:
turning a light on or off at the physical structure;
locking or unlocking a door of the physical structure;
turning an alarm on or off at the physical structure; and
arming or disarming a security system at the physical structure.

13. The method of claim 11, further comprising:
automatically determining a content of the image data.

14. The method of claim 13, wherein automatically determining the content includes performing facial recognition.

15. The method of claim 13, further comprising:
sending the image data to the remote computing device only when the content satisfies predetermined criteria.

16. An automation system for a physical structure, comprising:
a control panel configured to communicate with at least one mobile wireless device, including sending image data to the at least one mobile wireless device using electronic messaging protocols and configured to receive data from the at least one mobile wireless device and establish a real-time communication session, between the at least one mobile wireless device and a communication system associated with an entry of the physical structure, to communicate with a person at or near the entry of the physical structure based at least in part on the received data from the at least one mobile wireless device;
at least one automation component wirelessly connected to the control panel through short range wireless communication protocols, wherein the at least one automation component includes:
at least one motion sensor configured to detect a presence of the person at or near the entry to the physical structure for a period of time, the at least one motion sensor further configured to detect a physical action being performed by the person at or near the entry to the structure;
at least one camera partially exterior to and integrated with a physical component, the physical component comprising an illumination source exterior to the entry of the physical structure, wherein the at least one camera is part of an image capture system extending from an interior of the physical component to an exterior of the physical component, the image capture system configured to capture an image of the person in response to the at least one motion sensor activating the at least one camera based at least in part on detecting that the person is present for the period of time and the detected physical action being performed by the person at or near the entry to the structure compare the image of the person to a database of images associated with the structure, and identify an identity of the person based at least in part on the comparing, the at least one automation component further configured to automatically trigger a lighting system of a home automation system to change a state of one or more illumination sources at the physical structure based at least in part on the identity, wherein the image capture system uses a power supply of the illumination source exterior to the entry of the structure that is different than a second power supply of a control panel located at the structure; and at least one short range wireless transceiver coupled to the at least one sensor and the at least one camera and configured to communicate image and sensor data to the control panel based at least in part on determining that the identity of the person associated with the captured image satisfies a predetermined user preference, the predetermined user preference indicating an unknown person, and further configured to send a message comprising image data or video data to the mobile wireless device based at least in part on bypassing displaying the message at the control panel located at the physical structure when an occupant associated with the physical structure is located remotely from the physical structure, wherein communicating the image and sensor data to the control panel comprises transmitting data associated with the image from the camera partially exterior to and integrated with the physical component exterior to the entry of the structure to a component of the image capture system within the interior of the physical component.

17. The automation system of claim 16, wherein the control panel is further configured to:
   automatically store the captured image of the person in a local memory of the automation system based at least in part on the identity of the person.

18. The automation system of claim 16, wherein the control panel includes an image capture module operable to:
   determine when the at least one motion sensor indicates the presence of the person at the entry;
   selectively capture at least one image at the entry when the person is present; and
   selectively send the at least one image to the at least one mobile wireless device.

* * * * *